United States Patent
Kono et al.

(10) Patent No.: US 8,542,502 B2
(45) Date of Patent: Sep. 24, 2013

(54) ELECTRICAL POWER CONVERSION APPARATUS

(75) Inventors: Masaki Kono, Chiyoda-ku (JP); Keita Hatanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 124 days.

(21) Appl. No.: 13/123,434

(22) PCT Filed: May 28, 2009

(86) PCT No.: PCT/JP2009/002349
§ 371 (c)(1),
(2), (4) Date: Apr. 8, 2011

(87) PCT Pub. No.: WO2010/050086
PCT Pub. Date: May 6, 2010

(65) Prior Publication Data
US 2011/0194318 A1 Aug. 11, 2011

(30) Foreign Application Priority Data
Oct. 31, 2008 (WO) .................. PCT/JP2008/003132

(51) Int. Cl.
*H02J 3/00* (2006.01)
*H02J 1/10* (2006.01)
*H02M 5/45* (2006.01)
*H02M 5/458* (2006.01)

(52) U.S. Cl.
USPC .................................. 363/34; 363/37; 363/65

(58) Field of Classification Search
USPC ............................................... 363/34, 37, 65
See application file for complete search history.

(56) References Cited

U.S. PATENT DOCUMENTS
4,666,020 A * 5/1987 Watanabe ..................... 187/290
5,250,890 A 10/1993 Tanamachi et al.
(Continued)

FOREIGN PATENT DOCUMENTS
CN 2907030 Y 5/2007
CN 101040427 A 9/2007
(Continued)

OTHER PUBLICATIONS
International Search Report (PCT/ISA/210) issued on Sep. 1, 2009, by Japanese Patent Office as the International Searching Authority for International Application No. PCT/JP2009/002349.
(Continued)

*Primary Examiner* — Adolf Berhane
*Assistant Examiner* — Gary Nash
(74) *Attorney, Agent, or Firm* — Buchanan Ingersoll & Rooney PC

(57) ABSTRACT

An electrical conversion apparatus including a converter and an inverter comprises a capacitor that stores a DC electrical power; a ripple detection unit that detects a ripple of an active power that is output from the inverter; a voltage measuring instrument that measures a voltage across the capacitor; a DC voltage command generation unit that calculates a command value of the voltage across the capacitor according to a frequency of the AC voltage output from the inverter; and a DC voltage control unit that receives the voltage measured by the voltage measuring instrument and the command value calculated by the DC voltage command generation unit, to control the converter so that the voltage across the capacitor becomes the command value, wherein the DC voltage command generation unit makes the command value of the voltage across the capacitor higher than usual, within a predetermined range including a frequency of a ripple component of the voltage across the capacitor.

15 Claims, 17 Drawing Sheets

(56) References Cited

U.S. PATENT DOCUMENTS

| | | | | |
|---|---|---|---|---|
| 5,373,223 A | * | 12/1994 | Akagi et al. | 318/722 |
| 5,535,113 A | * | 7/1996 | Konishi | 363/35 |
| 5,666,275 A | * | 9/1997 | Inokuchi et al. | 363/35 |
| 5,742,493 A | * | 4/1998 | Ito et al. | 363/37 |
| 2001/0036093 A1 | * | 11/2001 | Tanikawa et al. | 363/37 |
| 2003/0214823 A1 | * | 11/2003 | Kawazoe et al. | 363/37 |
| 2008/0284367 A1 | | 11/2008 | Kawashima et al. | |

FOREIGN PATENT DOCUMENTS

| | | |
|---|---|---|
| CN | 101127490 A | 2/2008 |
| JP | 64-077492 A | 3/1989 |
| JP | 2-261059 A | 10/1990 |
| JP | 7-046918 B | 5/1995 |
| JP | 7-115788 A | 5/1995 |
| JP | 2002-252994 A | 9/2002 |
| JP | 2003-189689 A | 7/2003 |
| JP | 2006-034062 A | 2/2006 |

OTHER PUBLICATIONS

Nakata et al., "Beat Phenomenon of PWM inverter driven with a rippled DC power source", Annual Meeting, I.E.E. Japan, 1988.

Office Action from Chinese Patent Office dated Apr. 17, 2013, issued in corresponding Chinese Patent Application No. 200980143719.8, with English translation thereof.

* cited by examiner (a)

(b)

ELECTRICAL POWER CONVERSION APPARATUS

TECHNICAL FIELD

The present invention relates to electrical conversion apparatuses that convert a direct current (DC) electric power to a variable-frequency, variable-voltage alternating current (AC) electric power, and in particular to an AC-AC electrical power conversion apparatus that includes a converter and an inverter that converts a DC output electric power output from the converter into a variable-frequency, variable-voltage AC electric power.

BACKGROUND ART

A PWM converter for use in an electric railway vehicle receives an AC input from a single-phase AC power source between an overhead line and a rail by way of a pantagraph, a transformer and the like, to convert the power from the source into power of a predetermined DC voltage. A capacitor for smoothing the voltage is provided on the DC side of the PWM converter, and an inverter for driving an induction motor is connected to the capacitor. The voltage across the capacitor is detected by a voltage detector, thereby sensing a DC input voltage that is to be applied to the inverter. A current detector is provided on the AC side of the inverter.

A reference output frequency of the inverter is created by adding together, using an adder, a rotation frequency—which is an output of rotation frequency detecting means of the induction motor—and a reference slip frequency—which is an output of slip frequency control. An output current value detected by the current detector is provided to current root-mean-square (RMS) value calculating means, thereby calculating a current RMS value. The current RMS value is transmitted to the adder together with a command current value, thus calculating the reference slip frequency using frequency control means.

A DC input voltage to the inverter is detected by a voltage detector and only its ripple component is derived by a voltage ripple component detecting means. The DC input voltage to the inverter is also input to DC voltage component detecting means and only its DC component is derived therefrom. A divider divides the ripple component by the DC component, to calculate a ripple factor of the DC input voltage, and a multiplier multiples the ripple factor by a reference inverter frequency to calculate an amount of inverter frequency correction. The inverter frequency is calculated by adding the amount of reference inverter frequency to the amount of inverter frequency correction using an adder. This inverter frequency is provided to voltage control means, and a PWM control circuit in turn provides a PWM control signal to the inverter (refer to Patent Document 1, FIG. 1 and its corresponding description).

On the other hand, Non-Patent Document 1 has verified the advantageous effect of Patent Document 1 through experiments. Further, Non-Patent Document 1 (FIG. 7) provides description of a ripple characteristic of a DC power source in a PWM converter for use in a railway vehicle. As for a relationship between the capacitance of DC capacitor and a suppression effect of a beating phenomenon (Non-Patent Document 1 describes based on a beat rate showing how many times a fluctuation range of an inverter output current is greater than that in situations where no beat occurs), Non-Patent Document 1 explains that in order to achieve the suppression effect such that the beat rate is 1.2 times or less, the ripple factor of DC voltage (a ratio of a DC ripple magnitude over a DC average voltage) is reduced to 10% or less. It is described that the capacitance of DC capacitor must be determined to be approximately 30 mF or more (3750 µF per motor) per 8 motors (output rating of approx. 3000 kW), for instance.

PATENT DOCUMENT 1

Japanese Patent Publication H07-46918 (FIG. 1)

NON-PATENT DOCUMENT 1

K. Nakata, A. Kimura, T. Tanamachi, Y. Tsutsui, and K. Nakamura: No. 845 "Beat phenomenon in PWM inverter driven on ripple DC power source," Proceedings of Annual Meeting, I.E.E. Japan, 1988, pp 1039-1040

DISCLOSURE OF INVENTION

Problem that the Invention is to Solve

As described above, in the electrical power conversion apparatus according to Patent Document 1, the ripple factor of the DC input voltage is calculated by dividing its ripple component by its DC component, and the amount of inverter frequency correction is calculated by multiplying the ripple factor by the reference inverter frequency, whereby the inverter frequency is adjusted according to the ripple of the DC input voltage, thereby enabling the current and torque ripple to be reduced.

However, a problem with the apparatus of Patent Document 1, as described in Non-Patent Document 1, is that in order to achieve a predetermined effect of reducing the beating phenomenon, a constraint is applied such that the capacitance of the DC capacitor is determined so that the ripple factor of the DC voltage is small. That is, since the beating phenomenon is enhanced at a frequency of twice the AC power source frequency, the capacitance of the DC capacitor is determined by limiting the ripple component of DC voltage to 10% or less thereof in the frequency and therefore the problem is that the capacitance of the DC capacitor is increased because of the particular frequency point where the beating phenomenon is maximized.

The present invention is directed to overcome the above problem and an object thereof is to reduce the capacitance of the DC capacitor of an electrical conversion apparatus, as well as to suppress a motor current ripple on the output side of the electrical conversion apparatus and associated torque ripple.

Means for Solving the Problem

An electrical power conversion apparatus comprises a converter that converts an AC power from an AC power source into a DC power; a capacitor that stores the DC power produced from the converter; an inverter that converts to an AC power the DC power stored in the capacitor; a voltage control unit that calculates command values for an AC voltage to be output from the inverter, to control the inverter so that the command value is produced; a current measuring instrument that measures an AC current output from the inverter; a ripple detection unit that receives the AC voltage command values calculated by the voltage control unit and the AC currents measured by the current measuring instrument, to detect a ripple of an active power output from the inverter; a voltage measuring instrument that measures the voltage across the capacitor; a DC voltage command generation unit that calculates a command value of the voltage across the capacitor according to a frequency of the AC voltage output from the inverter; and a DC voltage control unit that receives the voltage measured by the voltage measuring instrument and the command value calculated by the DC voltage command generation unit, to control the converter so that the voltage across the capacitor becomes the command value, wherein the DC voltage command generation unit makes the command values of the voltage across the capacitor higher than usual in a situation where the frequency of AC voltage output from the inverter is within a predetermined range including a frequency of a ripple component of the voltage across the capacitor, and the voltage control unit receives the ripple component derived from the ripple detection unit, to calculate the command values for the AC voltage output from the inverter so that the ripple component is reduced.

Advantageous Effects of the Invention

An electrical power conversion apparatus comprises a converter that converts an AC power from an AC power source into a DC power; a capacitor that stores the DC power produced from the converter; an inverter that converts to an AC power the DC power stored in the capacitor; a voltage control unit that calculates command values for an AC voltage to be output from the inverter, to control the inverter so that the command value is produced; a current measuring instrument that measures an AC current output from the inverter; a ripple detection unit that receives the AC voltage command values calculated by the voltage control unit and the AC current measured by the current measuring instrument, to detect a ripple of an active power output from the inverter; a voltage measuring instrument that measures the voltage across the capacitor; a DC voltage command generation unit that calculates a command value of the voltage across the capacitor according to a frequency of the AC voltage output from the inverter; and a DC voltage control unit that receives the voltage measured by the voltage measuring instrument and the command value calculated by the DC voltage command generation unit, to control the converter so that the voltage across the capacitor becomes the command value, wherein the DC voltage command generation unit makes the command values of the voltage across the capacitor higher than usual in a situation where the frequency of AC voltage output from the inverter is within a predetermined range including a frequency of a ripple component of the voltage across the capacitor, and the voltage control unit receives the ripple component derived from the ripple detection unit, to calculate the command values for the AC voltage output from the inverter so that the ripple component is reduced. Therefore, in addition to the fact that the motor current and torque ripple on the output side can easily be reduced by detecting and controlling an AC side ripple that is to be reduced, an advantageous effect is that the capacitance of DC capacitor for the electrical conversion apparatus can be reduced.

BRIEF DESCRIPTION OF DRAWINGS

FIG. 7($a$) shows a torque waveform generated by implementing Embodiment 1, FIG. 7($b$) showing a torque waveform generated when the reduction control of the torque ripple is not executed;

REFERENCE NUMERALS

Figure 1:
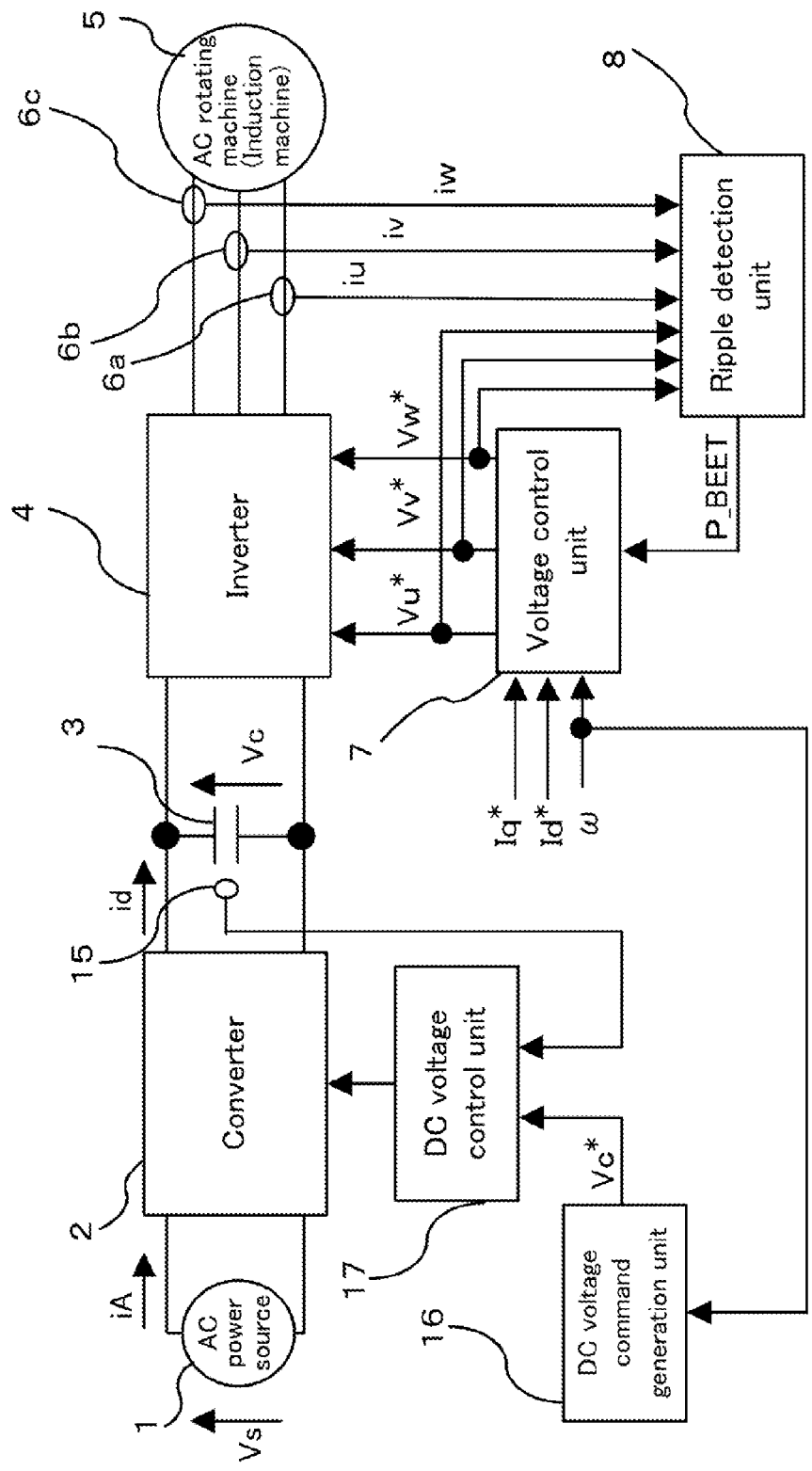
FIG. 1 is a block diagram showing an example of a configuration of an electrical power conversion apparatus according to Embodiment 1 of the present invention.

1 Single-phase AC power source
2 Converter
3 Capacitor
4 Inverter
5 Induction machine (AC rotating machine)
6$a$ Current detection unit
6$b$ Current detection unit
6$c$ Current detection unit
7 Voltage control unit
7A Voltage control unit
8 Ripple detection unit
8A Ripple detection unit
9$a$ Multiplier
9$b$ Multiplier
9$c$ Multiplier
10 Adder 11 Active power calculation unit
11A Active power calculation unit
12 Band-pass filter
13 High-pass filter
14 Low-pass filter
15 DC voltage detection unit
16 DC voltage command generation unit
16A DC voltage command generation unit
16B DC voltage command generation unit
16C DC voltage command generation unit
17 DC voltage control unit
18 Absolute value unit
18b Absolute value unit
19 DC voltage value set table
19B DC voltage value set table
20 Phase calculation unit
21 Three-phase to dq-axis conversion calculation unit
22a Multiplier
22b Multiplier
23 Adder
24 Subtracter
25 Divider
26 Limiter
27 Multiplier
28 Limiter
29 Limiter
30 Comparator
31 Switching unit
32 Correction gain calculation unit
33 Multiplier

BEST MODE FOR CARRYING OUT THE INVENTION

Embodiment 1

FIG. 1 is a block diagram showing an example of a configuration of an electrical power conversion apparatus according to Embodiment 1 of the present invention. The electrical power conversion apparatus includes a converter 2 that converts an AC power from a single-phase AC power source 1 into a DC power, a capacitor 3 that stores the DC power produced by rectifying the AC power using the converter 2, an inverter 4 that converts the DC power stored in the capacitor 3 into a three-phase AC power of arbitrary frequency. The inverter 4 drives an induction machine 5 that is an AC rotating machine. The converter 2 is controlled to convert AC power from the AC power source 1 of the commercial frequency into the DC power in a PWM (pulse width modulation) mode. The inverter 4 is controlled in a variable-voltage/variable-frequency (VVVF) mode in a low speed range of operation and in a constant-voltage/variable-frequency (CVVF) mode in a high speed range of operation.

Current detection units 6a, 6b and 6c, which are current measuring instruments on the AC side, detects phase currents iu, iv and iw that flow in the induction machine 5, respectively. FIG. 1 describes the current detection units 6a, 6b and 6c on the AC side that detect by means of CT or the like the currents flowing through connection lines that connect the inverter 4 to the induction machine 5; however, the phase currents may be detected through another known technique, using currents flowing through the electrical power conversion apparatus, such as bus currents. Since a relationship defined by an equation of iu+iv+iw=0 holds and the w-phase current can be calculated from detected currents for two other phases, u and v, a current detection unit 6c for the w-phase may be omitted.

A voltage control unit 7 determines the magnitude of AC voltage output from the inverter 4 based on a torque current command value Iq, a magnetic flux current command value Id, and a rotation angular frequency ω of the AC rotating machine. The angular frequency ω may be based on speed information derived from a speed sensor mounted on the induction machine 5. Alternatively, since there is a speed command value ω* available in a system in which the speed is controlled, the speed command value ω* may be used as the angular frequency ω. In addition, the angular frequency ω may be an estimated speed value that is calculated in a speed sensorless control in which a speed sensor is not mounted.

Figure 2:
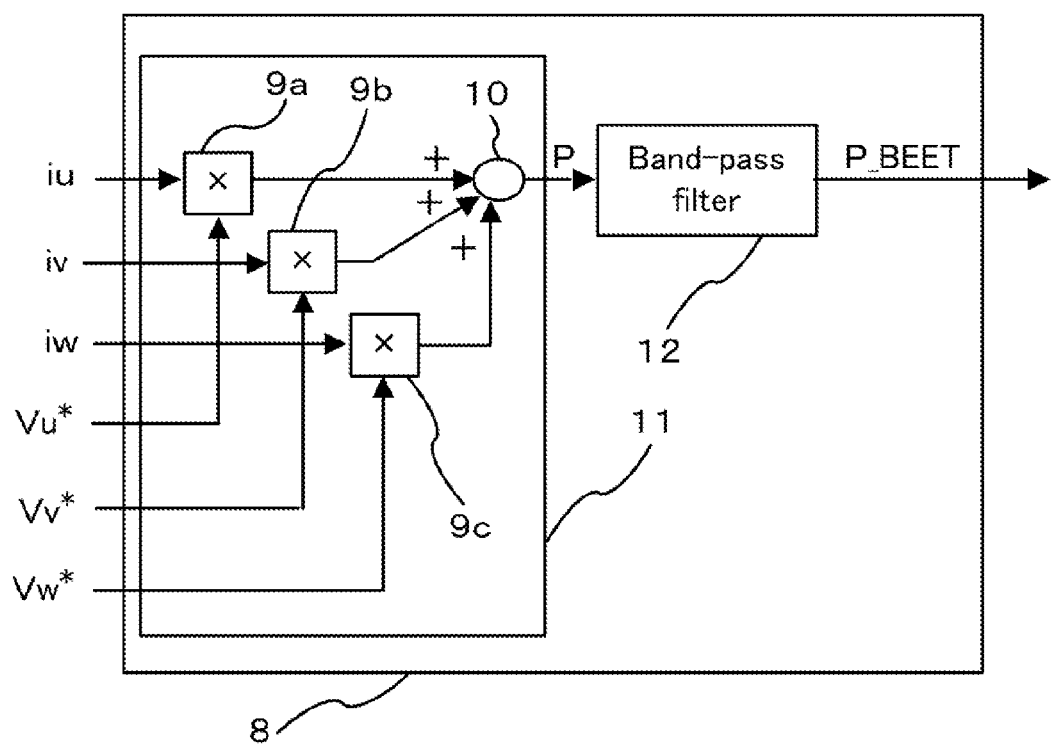
FIG. 2 is a diagram illustrating a configuration of a ripple detection unit in the electrical power conversion apparatus according to Embodiment 1 of the present invention.

FIG. 2 is a diagram illustrating a configuration of a ripple detection unit 8 in the electrical power conversion apparatus according to Embodiment 1 of the present invention. The ripple detection unit 8, which detects a ripple component due to AC-DC conversion by the converter 2, includes an active power calculation unit 11 and a band-pass filter 12. The active power calculation unit 11 calculates an active power P that is to be output from the inverter 4 by summing together respective values calculated by multiplying Vu* by iu, Vv* by iv, and Vw* by iw, using phase currents iu, iv and iw that are detected with the current detection unit 6 and voltage command values Vu*, Vv*, Vw* that are calculated with the voltage control unit 7 and are to be output from the inverter 4. The band-pass filter 12 derives a ripple component of the active power P output from the active power calculation unit 11. The active power calculation unit 11 calculates the active power P based on the following equation.

$$P = Vu^* \times iu + Vv^* \times iv + Vw^* \times iw \quad (1)$$

The active power, which is an output from the active power calculation unit 11, includes a ripple component of a motor current resulting from the ripple component due to AC-DC conversion by the converter 2. Note that the active power may be calculated using voltage and current values in a rotating orthogonal coordinate system.

A band-pass filter 12 in FIG. 2 derives only the ripple component due to AC-DC conversion by the converter 2 and contained in the active power P. When the AC power source 1 is a single-phase power source of the commercial frequency, the frequency of the single-phase power source is 60 Hz or 50 Hz in Japan. Thus, the ripple component due to AC-DC conversion by the converter 2 is 120 Hz or 100 Hz in frequency, which is twice the frequency of the single-phase AC power source.

Figure 3:
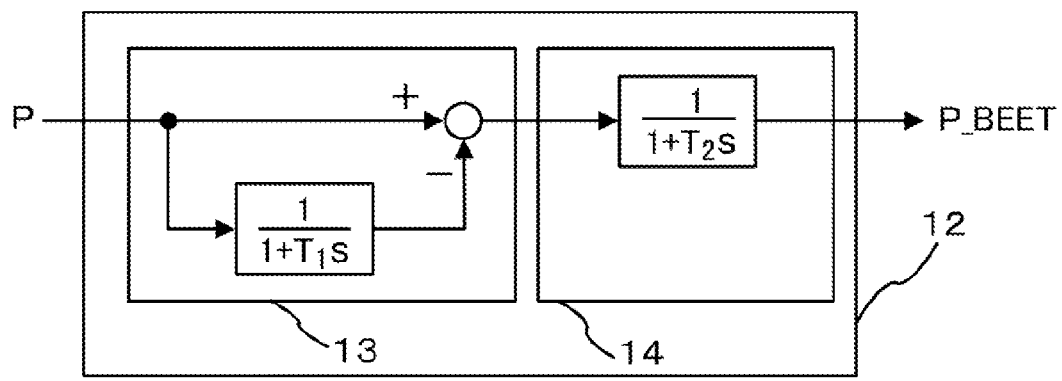
FIG. 3 is a diagram illustrating a band-pass filter in the electrical power conversion apparatus according to Embodiment 1 of the present invention.

In the present embodiment, the band-pass filter 12 is configured assuming that the frequency of the single-phase AC power source is, for example, 60 Hz. FIG. 3 shows a diagram illustrating the band-pass filter. The band-pass filter 12 is configured by a combination of a high-pass filter (HPF) 13 that passes therethrough frequencies higher than those corresponding to a time constant $T_1$, which is a first time constant, and a low-pass filter (LPF) 14 that passes therethrough frequencies lower than those corresponding to a time constant $T_2$, which is a second time constant. The time constant $T_1$ of the high-pass filter and the time constant $T_2$ of the low-pass filter are determined such that $T_1=60$ Hz and $T_2=180$ Hz in order to have a center frequency at 120 Hz. Namely, the time constants $T_1$ and $T_2$ are defined by Expression (2) and (3).

$$T_1 = 1/(2\pi \times 60) \quad (2)$$

$$T_2 = 1/(2\pi \times 180) \quad (3)$$

Figure 4:
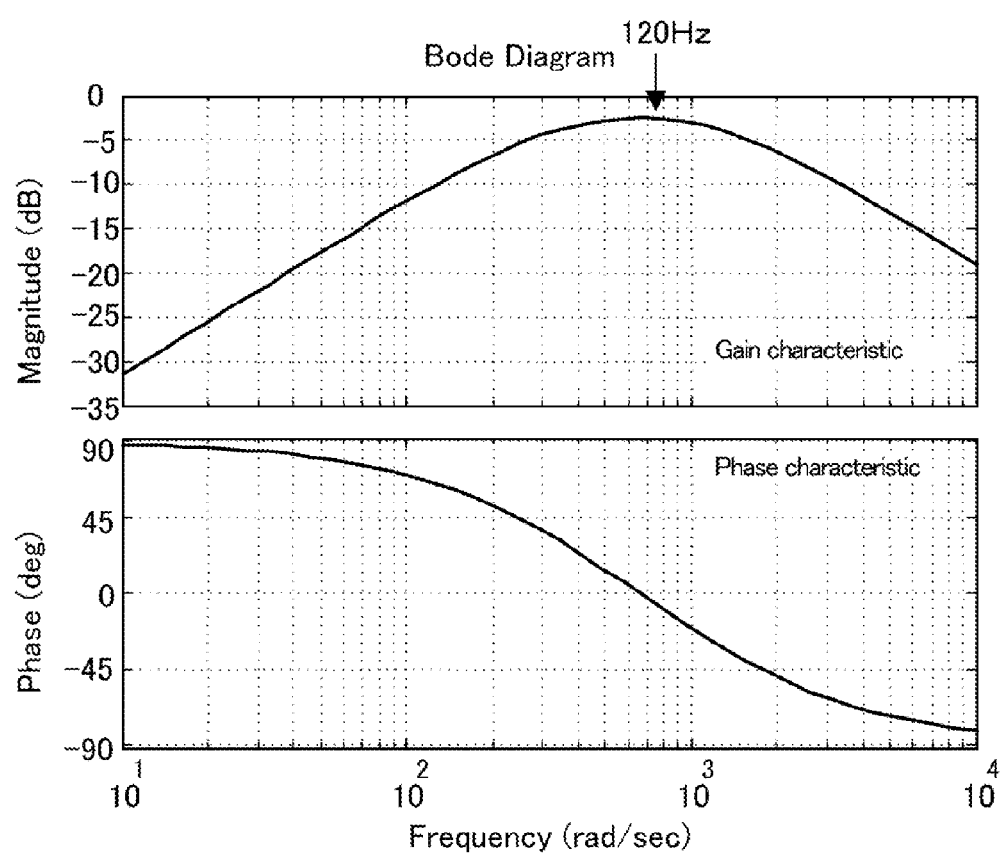
FIG. 4 is a diagram showing a frequency gain characteristic and phase characteristic of an example of a band-pass filter in the electrical power conversion apparatus according to Embodiment 1 of the present invention.

An example of a gain characteristic and a phase characteristic (generally called Bode diagram) in a frequency generated when the band-pass filter 12 of FIG. 3 is configured with the time constants given by Expression (2) and (3), is as shown in FIG. 4. The characteristics shown in FIG. 4 indicates that the gain characteristic is one that passes the frequencies around 120 Hz with almost no attenuation. For that reason, the band-pass filter 12 can derive the 120 Hz component—a ripple component due to AC-DC conversion by the converter 2—to output a ripple component P_BEET.

Referring back to FIG. 1, the electrical power conversion apparatus according to the present invention includes a DC voltage command generation unit 16 and a DC voltage control unit 17. The DC voltage command generation unit 16 is supplied with the rotation angular frequency ω of the AC rotating machine, to generate a command value Vc* for a DC voltage Vc that is a voltage across the capacitor 3 to be charged by the converter 2 and that is measured by a DC voltage detection unit 15 that is a voltage measuring instrument. The DC voltage control unit 17 controls the converter 2 in accord with the command value Vc*. The DC voltage command generation unit 16 increases the DC voltage only during a time when the angular frequency ω output from the inverter 4 has much influence, resulting from the ripple of the DC power, on a torque and the like.

A mathematical analysis will be described below in terms of a reason in which the capacitance of the capacitor 3 can be reduced by controlling the magnitude of the DC voltage according to the condition of the inverter 4 in accordance with the present invention. Assuming that an input current iA to the converter 2 is a sinusoidal wave, an input power source voltage Vs and the input current iA to the converter 2 are represented as follow:

$$Vs = \sqrt{2} \times E \times \cos(\omega t + \phi) \qquad (4)$$

$$iA = \sqrt{2} \times I \times \cos(\omega t) \qquad (5)$$

From the above equations, an input power Pin to the converter 2 is represented by the following equation.

$$Pin = 2 \times E \times I \times \cos \times (\omega t + \phi) \times \cos(\omega t) \qquad (6)$$
$$= E \times I \times (\cos(2\omega t + \phi) + \cos\phi)$$

where constant term in Expression (6) refers to a power supplied to a load and the sinusoidal wave component that varies with twice the angular frequency of ω refers to a ripple power supplied to the capacitor 3. Since a power factor in the converter 2 is controlled to be a value of one, cos φ is 1.0, and the constant term is simplified to E×I.

When the ripple power component in Expression (6) is designated Pin~, Pin~ is represented by the following equation.

$$Pin\text{\textasciitilde} = E \times I \times (\cos(2\omega t + \phi)) \qquad (7)$$

On the other hand, the capacitance of the capacitor 3 is represented as C and the voltage across the capacitor 3, as Vc, and if it is assumed that no influence due to the ripple of the voltage Vc across the capacitor 3 occurs on the inverter 4 side, the following equation holds. Here, the voltage Vc across the capacitor 3 is called DC voltage.

[Equation 1]

$$Pin\text{\textasciitilde} = \frac{d}{dt}\left(\frac{1}{2} \cdot C \cdot Vc^2\right) = Vc \cdot C \cdot \frac{d}{dt}Vc \qquad (8)$$

By substituting Expression (7) into Expression (8), the following differential equation is expressed in terms of the DC voltage Vc.

[Equation 2]

$$Vc \cdot C \frac{d}{dt} Vc = E \cdot I \cdot \cos(2\omega t + \phi) \qquad (9)$$

Solving the differential equation of Expression (9), with an average value Vcav of the DC voltage as an initial value, provides a solution as below.

[Equation 3]

$$Vc = \sqrt{V_{cav}^2 + \frac{E \cdot I}{\omega C}\sin(2\omega t + \phi)} \qquad (10)$$
$$\cong V_{cav} + \frac{E \cdot I}{2\omega C V_{cav}}\sin(2\omega t + \phi)$$

where Expression (10) assumes that a value of (E×I)/(2ωC×Vcav²) is sufficiently smaller than a value of one, and an approximation is used, such that √(1+ε)≅1+ε/2 in terms of symbol ε that is sufficiently smaller than a value of one.

The second terms of Expression (10) represents a ripple component of the DC voltage Vc. The ripple component has a frequency of twice the power source frequency, and it is seen that its magnitude is reversely proportional to the capacitor capacitance C and the average value of the DC voltage Vc. The value (E×I) represents a power to be supplied to the converter 2, and is maintained constant even though the DC voltage Vc varies.

A current is flowing in the DC capacitor is obtained based on the following equation.

[Equation 4]

$$i_c = C\frac{d}{dt}V_c = \frac{E \cdot I}{V_{cav}}\cos(2\omega t + \phi) \qquad (11)$$

Calculating based on Expression (10) the ripple factor δ of the DC voltage used in Non-Patent Document 1, the ripple factor δ is as given in Expression (12).

[Equation 5]

$$\delta = \frac{\frac{E \cdot I}{2\omega C V_{cav}}}{V_{cav}} \times 100 \ [\%] \qquad (12)$$
$$= \frac{E \cdot I}{2\omega C (V_{cav})^2} \times 100 \ [\%]$$

Expression (12) shows that if a value of (E×I)/2ωC is constant and when the average value Vcav of the DC voltage Vc is increased, the ripple factor can be reduced inversely proportionally to the square of the value Vcav. Further, Expression (12) indicates that when the ripple factor is assumed to remain the same, the capacitor capacitance C can be reduced if the average value Vcav of the DC voltage Vc is increased. Expression (12) shows that, by increasing the average value Vcav of the DC voltage Vc by, for instance, 20% from 3000 V to 3600 V, the capacitor capacitance, provided that the same ripple factor is applied, can be reduced approximately 30% (more specifically 30.6%).

Expression (10) and (12) are theoretical equations under assumption that the ripple of the DC voltage Vc has no influence on the output side of the inverter 4; however, they hold in a substantially similar fashion even when the power output from the inverter 4 contains a ripple component.

Steady increase of the DC voltage results in an increase in a rated voltage of a switching device constituting the inverter 4, thus leading to the use of a switching device having a higher voltage rating; therefore, there is a possibility of increasing costs. Further, even when the switching device, which has the same voltage rating, can be used, the use of the switching device with a higher voltage than the rated voltage results in reduction of the lifetime of the device. In consideration of these factors, the DC voltage is increased only during times when the inverter 4 generates a voltage whose angular frequency ω has much influence, resulting from the ripple of DC voltage, on the torque and the like.

When the inverter is operated in a one-pulse mode, the influence of the DC voltage on the switching device is reduced in comparison with a multi-pulse mode, even though the DC voltage is increased to more than the rated voltage, as will be described in detail later.

Figure 5:
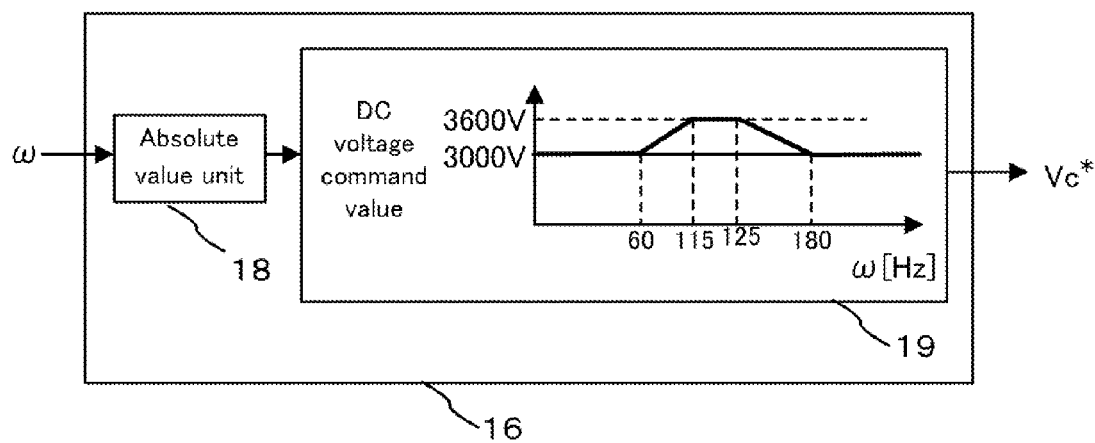
FIG. 5 is a diagram showing a DC current command generation unit in the electrical power conversion apparatus according to Embodiment 1 of the present invention.
Figure 15:
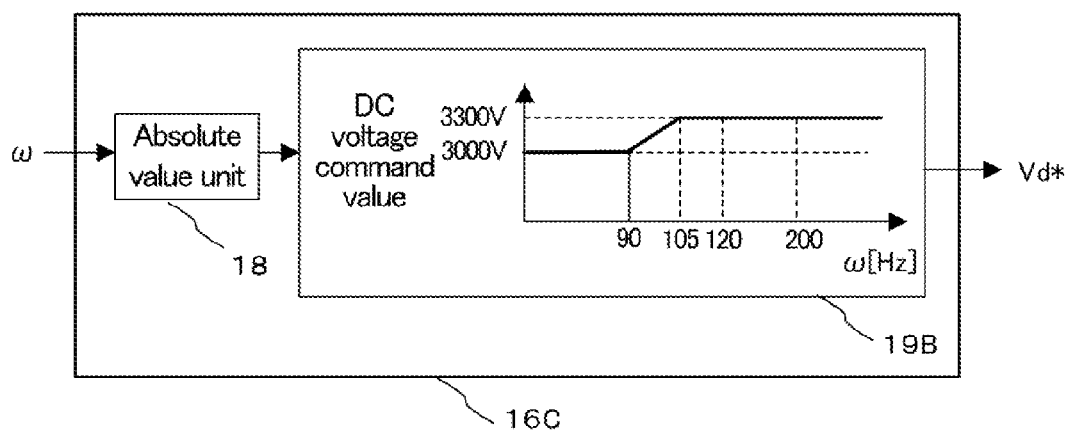
FIG. 15 is a diagram showing a DC current command generation unit in the electrical power conversion apparatus according to Embodiment 4 of the present invention.

FIG. 5 is a diagram showing the DC current command generation unit in the electrical power conversion apparatus according to Embodiment 1 of the present invention. The DC voltage command generation unit 16 is configured with an absolute value unit 18 that converts the angular frequency ω to its absolute value, and a DC voltage value set table 19. The absolute value unit 18 takes an absolute value of the angular frequency ω so that only a positive value is selected in order to simplify the DC voltage value set table 19 because the angular frequency ω to be supplied is assigned a positive or negative sign. In the DC voltage value set table 19, the angular frequency ω that turns the absolute value is shown on the horizontal axis and a DC voltage command value to be generated, on the vertical axis. In the DC voltage value set table 19 as shown in FIG. 15, the DC voltage is at its maximum voltage of 3600 V in a range (in the present embodiment, a range of 115 Hz to 125 Hz, inclusive) including the frequency that is twice (in this case, the frequency is at 120 Hz; however, 100 Hz may in some cases be used depending on an AC power source) the frequency of the AC power source where the voltage across the capacitor 3 contains a ripple component, in other words, there is a large beating phenomenon. In the previous range (a range of 60 Hz to 115 Hz, inclusive), the DC voltage is increased progressively, and in the subsequent range (a range of 125 Hz to 180 Hz, inclusive), the DC voltage is decreased progressively. Progressively increasing and decreasing the DC voltage can relieve stress, caused by increasing the DC voltage, on the switching device constituting the inverter 4. In the present embodiment, the DC voltage is increased in the predetermined range (a range of 60 Hz to 180 Hz, inclusive). The range where the DC voltage becomes a maximum is from 115 Hz to 125 Hz, inclusive.

In the DC voltage value set table 19, the predetermined range in which the DC voltage is increased more than usual is determined to be within a range where a beat rate B is permissible. The beat rate is based on the following equation that is defined in Non-Patent Document 1.

$$\beta = (b-a)/a \quad (A)$$

where numeral "b" is a fluctuation range of an inverter output current, and numeral "a" is a fluctuation range of an output frequency of the inverter output current.

The upper limit value of a predetermined frequency range where the DC voltage is increased more than usual needs to be a value where a beat rate at a usual DC voltage is permissible. Ditto for the lower limit value of the predetermined frequency range. In the frequency range where the DC voltage is increased more than usual, the range is needed to be selected such that the beat rate of DC voltage is permissible at any frequency in the range. Extending the frequency range where the DC voltage is increased more than usual ensures that the beat rate will be within the permissible range. The predetermined range may be determined based on another indicator other than the beat rate. It also may be determined in whatever manner that allows a ripple component of the active power output from an inverter to be controlled within the allowable range.

The frequency range where the DC voltage is increased more than usual is suitably determined in consideration of values such as the beat rate β that is allowable, a target value of the ripple factor δ at the frequency of twice the AC power source frequency, and a ratio of a maximum value against a usual value of the DC voltage. Like the present embodiment, when the beat rate β is 1.2 or less, the ripple factor at the frequency of twice the AC power source frequency is 10%, and the ratio of the maximum value against the usual value of the DC voltage is 1.2, it generally suffices if a width of the frequency range for maximizing the value of the DC voltage is determined 10 Hz, as described previously.

In the DC voltage value set table 19, the table data are configured such that the DC voltage command value Vc* does not exceed an over-voltage set value of the inverter 4. The maximum value of increasing the DC voltage, 3600 V is determined in consideration of a rated voltage and characteristic of a switching device constituting the inverter 4.

The DC voltage control unit 17 receives the DC voltage command value Vc* that is an output from the DC voltage command generation unit 16 and the DC voltage Vc detected by the DC voltage detection unit 15. The control unit 17 calculates the difference between the DC voltage command value Vc* and the DC voltage Vc, to control the converter 2 so as to produce zero voltage difference between them.

Operation of the voltage control unit 7 that controls the voltage output from the inverter 4 will be described. First of all, motor constants of the induction machine, which are used for describing the operation of the voltage control unit 7, are defined as below.

Rs Primary resistance value of motor
Ls Primary inductance of motor
M Mutual inductance of motor
Lr Secondary inductance of motor
Rr Secondary resistance value of motor $$\sigma = 1 - M \times M/Ls/Lr$$

The voltage control unit 7 calculates a slip angular frequency command value ωs* using the torque current command value Iq* and the magnetic flux current command value Id* based on Expression (13).

$$\omega s^* = (Iq^*/Id^*) \times (Rr/Lr) \quad (13)$$

The inverter 4 calculates an inverter angular frequency ωinv that corresponds to the frequency of the voltage output from the inverter 4, by subtracting from a sum of the slip angular frequency command value ωs* and the frequency ω an amount of correction F_BEET obtained by multiplying a predetermined coefficient Kf by a ripple amount P_BEET calculated with the ripple detection unit 8. Namely, the inverter angular frequency ωinv is calculated based on Expression (14).

$$\omega\text{inv}=\omega+\omega s^*-F\_BEET \quad (14)$$

$$F\_BEET=Kf\times P\_BEET \quad (15)$$

In this way, a frequency of the voltage output from the inverter 4 is corrected based on a ripple component derived from the ripple detection unit 8 in the present embodiment 1. A d-axis voltage command value Vd* and a q-axis voltage command value Vq* on two rotational axes can be calculated using the inverter angular frequency ωinv, the torque current command value Iq* and the magnetic flux current command value Id*, based on Expression (16) and Expression (17).

$$Vd^*=Rs\times Id^*-\omega\text{inv}\times\sigma\times Ls\times Iq^* \quad (16)$$

$$Vq^*=Rs\times Iq^*+\omega\text{inv}\times Ls\times Id^* \quad (17)$$

As known by those skilled in the art, when the three-phase voltage or three-phase current is converted into that of two orthogonal rotational axes, a coordinate control axis is needed. A phase of the coordinate control axis—a rotating two-axis coordinate system based on the angular frequency ω—is assigned θ. The phase θ is calculated based on Expression (18) by integrating the inverter angular frequency ωinv.

[Equation 6]

$$\theta=\int\omega\text{inv}\cdot dt \quad (18)$$

Since a voltage phase θv of the voltage command value is slightly advanced with respect to the phase θ, the voltage phase θv is calculated based on Expression (19).

$$\theta v=\theta+\tan^{-1}(Vd^*/Vq^*) \quad (19)$$

Three-phase voltage command values Vu*, Vv* and Vw* are calculated based on Expression (20) using the voltage phase θv calculated using Expression (19), the d-axis voltage command value Vd* and the q-axis voltage command value Vq*.

[Equation 7]

$$\begin{pmatrix} Vu^* \\ Vv^* \\ Vw^* \end{pmatrix} = \sqrt{(Vd^*)^2+(Vq^*)^2} \begin{pmatrix} \cos(\theta v) \\ \cos\left(\theta v-\frac{2}{3}\pi\right) \\ \cos\left(\theta v+\frac{2}{3}\pi\right) \end{pmatrix} \quad (20)$$

The inverter 4 performs DC-AC conversion based on the three-phase voltage command values Vu*, Vv* and Vw*, calculated based on Expression (20) and obtained from the voltage control unit 7.

Figure 6:
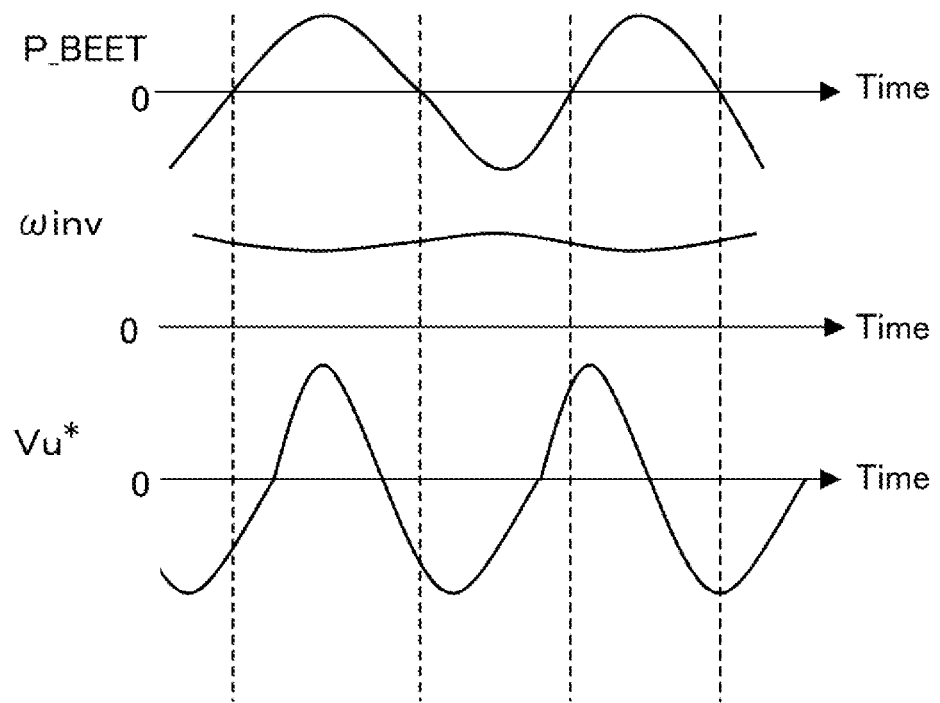
FIG. 6 is a graph illustrating an operation of the ripple detection unit and the DC current command generation unit in the electrical power conversion apparatus according to Embodiment 1 of the present invention.

The frequency of voltage output from the inverter 4 is corrected based on the ripple component derived from the ripple detection unit 8, thus enabling reductions of the motor current ripple on the output side of the inverter 4 and associated torque ripple. FIG. 6 shows a graph illustrating an operation of the ripple detection unit and the DC current command generation unit. It is assumed in FIG. 6 that Kf=1. If the ripple component P_BEET, derived from the ripple detection unit 8 in synchronization with the ripple of the motor current on the output side of the inverter 4 and associated torque ripple is positive in sign, then adjustments are made so as to reduce the inverter angular frequency ωinv, and the frequency of the three-phase voltage command values Vu*, Vv* and Vw* that are output from the voltage control unit 7 are reduced. Conversely, if the ripple component P_BEET, derived from the ripple detection unit 8, is negative in sign, adjustments are made so as to increase the inverter angular frequency ωinv, and the frequencies of the three-phase voltage command values Vu*, Vv* and Vw* that are output from the voltage control unit 7 are increased. This allows for the control operation in response to the ripple of the motor current on the output side of the inverter 4 and associated torque ripple, thereby reducing the motor current ripple and the torque ripple.

Figure 7:
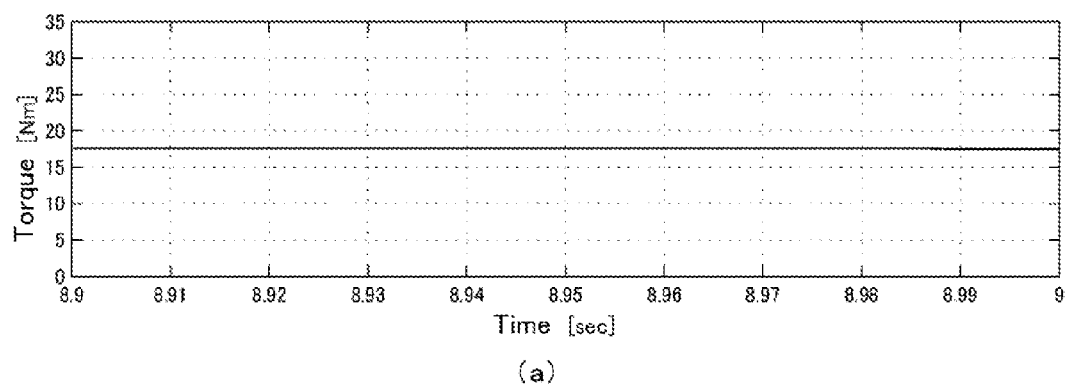
FIG. 7 is a set of graphs showing an effect of reducing a torque ripple by the electrical power conversion apparatus according to Embodiment 1 of the present invention.
Figure 7:
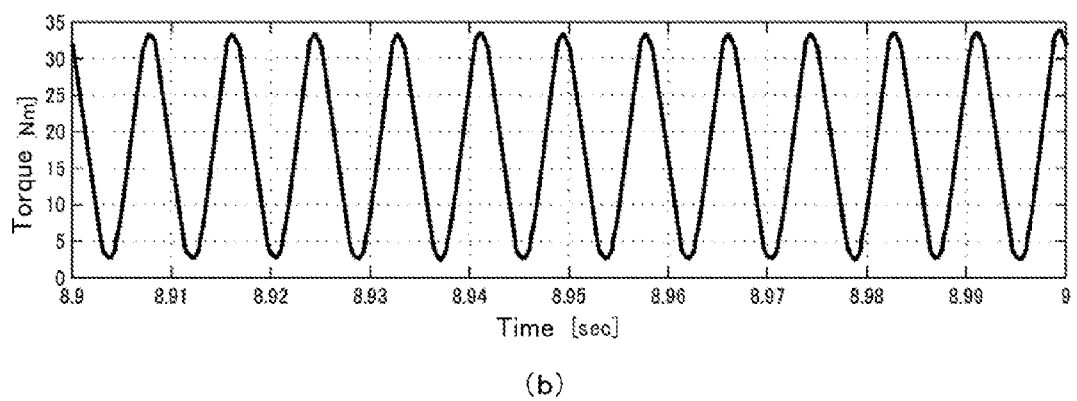

FIG. 7 is a set of graphs showing an effect of reducing a torque ripple by the electrical power conversion apparatus according to Embodiment 1 of the present invention. FIG. 7(*a*) shows a torque waveform generated by implementing Embodiment 1, FIG. 7(*b*) showing a torque waveform generated when the reduction control of the torque ripple is not executed. The torque waveforms shown in FIG. 7 are generated by simulations in which the DC voltage is set at 3600 V and the inverter frequency at 115 Hz. In FIG. 7(*b*) where the reduction control of the torque ripple is not executed, the torque waveform ripples at 120 Hz, which is twice the single-phase power sour frequency, while in FIG. 7(*a*) where Embodiment 1 is implemented, it can be recognized that the torque waveform has little ripple.

From the above description, by implementing Embodiment 1 the influence of the ripple due to the AC-DC conversion by the converter is detected as the ripple component contained in the active power of the inverter, thus correcting the frequency of the voltage output from the inverter, whereby an advantageous effect is provided in that the torque ripple and the like is reduced.

Further, by increasing the DC voltage during a time when the inverter generates the output frequency in which the beating phenomenon becomes large, the capacitance of the capacitor can be lowered which is necessary for reducing the beating phenomenon to within the permissible range. Consequently, compactness and cost reduction of electrical power conversion apparatus can be achieved.

In addition, this is also true for other embodiments.

Embodiment 2

Figure 8:
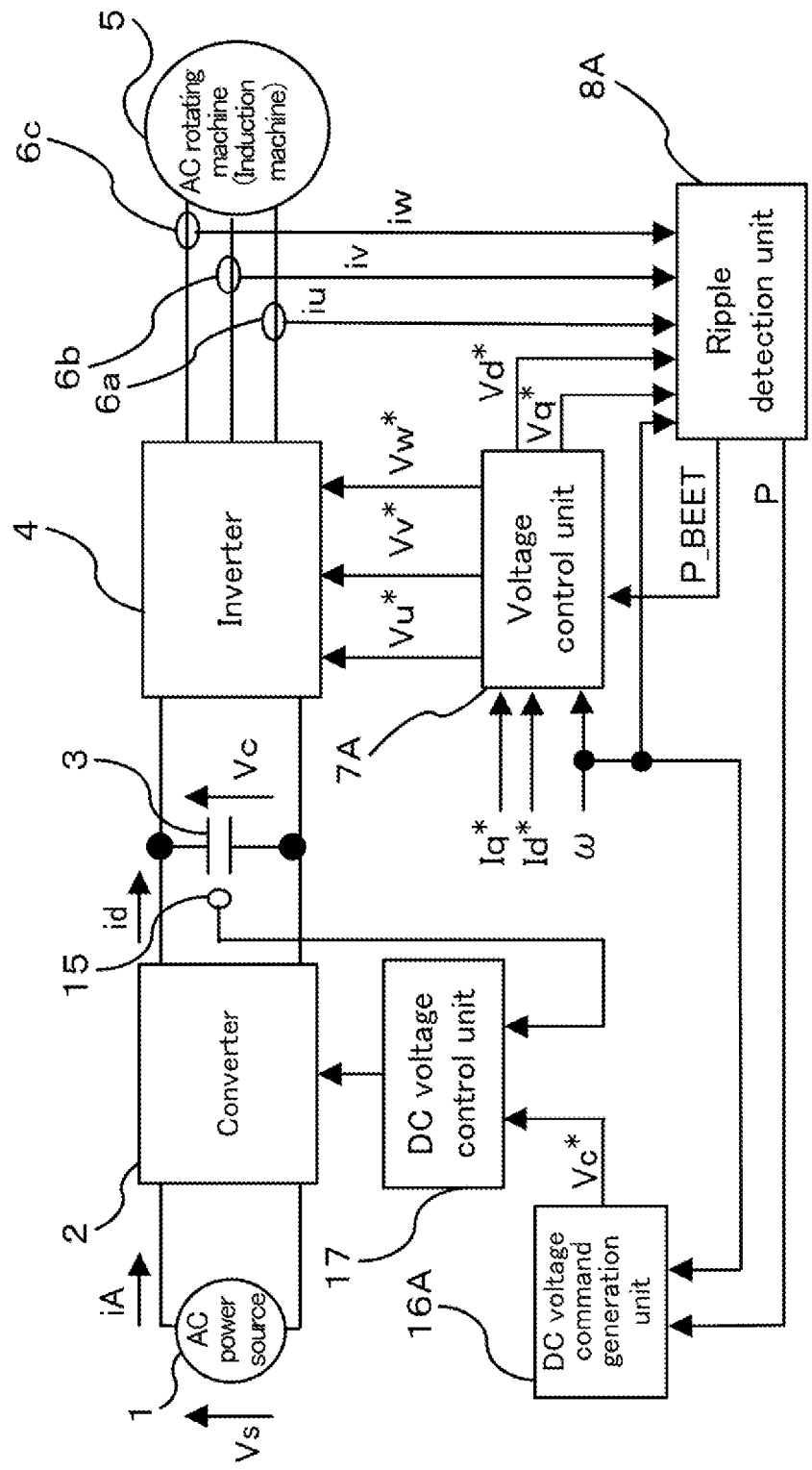
FIG. 8 is a block diagram showing an example of a configuration of an electrical power conversion apparatus according to Embodiment 2 of the present invention.
Figure 9:
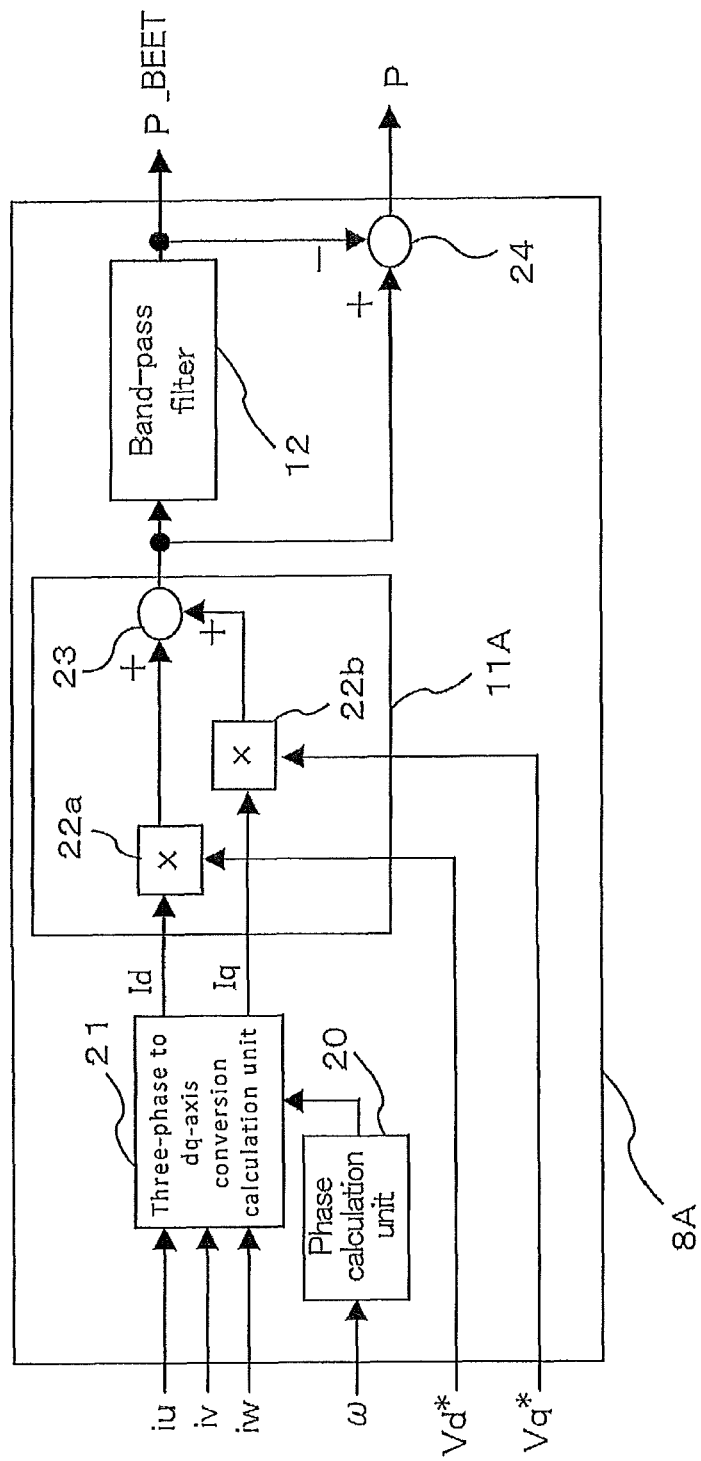
FIG. 9 is a diagram illustrating a configuration of a ripple detection unit in the electrical power conversion apparatus according to Embodiment 2 of the present invention.

FIG. 8 is a block diagram showing an example of a configuration of an electrical power conversion apparatus according to Embodiment 2 of the present invention. FIG. 9 is a diagram illustrating a configuration of a ripple detection unit in the electrical power conversion apparatus according to Embodiment 2 of the present invention. In Embodiment 2, a ripple detection unit 8A, a voltage control unit 7A and a DC voltage command generation unit 16A are different compared to those in Embodiment 1. In Embodiment 1, the active power is calculated from respective three-phase command values and respective three-phase currents, and a ripple component is derived from the active power, and a frequency is controlled based on the ripple component. In Embodiment 2, the ripple detection unit 8A calculates the active power from dq-axis voltage command values and dq-axis currents, and the voltage control unit 7A corrects an amplitude of the voltage command values according to the ripple component of the active power. The DC voltage command generation unit 16A operates so as to control the DC voltage according to the calculated value of the active power, and adjust the DC voltage to its usual value when the active power P is small in quantity and within a range where its beating phenomenon is permissible. Note that configurations other than those described are similar to those in Embodiment 1 and pertinent figures use the same reference numerals as well. Only the differences will be described herein.

In Embodiment 2, as shown in FIG. 9, the ripple detection unit 8A that detects the ripple component due to AC-DC conversion by the converter 2 includes a phase calculation unit 20, a three-phase to dq-axis conversion calculation unit 21 and an active power calculation unit 11A. The phase calculation unit 20 receives the angular frequency ω as an input, to calculate the phase θ by integrating, as shown in Expression (18), ωinv that is to be calculated as will be described later. The three-phase to dq axis conversion calculation unit 21 calculates d-q axis currents Id and Iq from the phase currents iu, iv and iw detected by the current detection unit 6, using the phase θ.

The active power calculation unit 11A calculates the active power P using the dq-axis currents Id and Iq calculated by the three-phase to dq-axis conversion calculation unit 21 and the dq-axis voltage command values Vd* and Vq* calculated by the voltage control unit 7A, based on the following equation.

$$P = Vd^* \times Id + Vq^* \times Iq \quad (21)$$

To calculate the values based on Expression (21), the active power calculation unit 11A includes multipliers 22a and 22b, and an adder 23, in which a value obtained by multiplication of Vd* and Id using the multiplier 22a and a value obtained by multiplication of Vq* and Iq using the multiplier 22b are summed together using the adder 23 to thereby generate the output of the adder 23 as the active power P.

The active power P, which is an output of the active power calculation unit 11A, contains a motor current ripple and a torque ripple component resulting from the ripple component due to the AC-DC conversion by the converter 2.

The active power P calculated by the active power calculation unit 11A is input to the band-pass filter 12, and the output P_BEET from the band-pass filter is input to the voltage control unit 7A.

The subtractor 24 subtracts the output P_BEET of the band-pass filter from the output of the active power calculation unit 11A, to output to the DC voltage command generation unit 16A the subtraction result as an active power P that does not contains the ripple component.

The voltage control unit 7A calculates the slip angular frequency command value ωs* from the torque current command value Iq* and the magnetic flux current command value Id*, using the motor constant of the induction machine. Namely, the slip angular frequency command value ωs* is calculated using Expression (13) as with Embodiment 1.

By summing together the slip angular frequency command value ωs* and the angular frequency ω, the inverter 4 calculates the inverter angular frequency ωinv that corresponds to a frequency of the voltage to be generated. That is, the inverter angular frequency ωinv is calculated based on Expression (22) shown below.

$$\omega inv = \omega + \omega s^* \quad (22)$$

The d-axis voltage command value Vd* and the q-axis voltage command value Vq* on the two rotating axes can be calculated from the inverter angular frequency w, the torque current command value Iq* and the magnetic flux current command value Id*. Namely, the d-axis voltage command value Vd* and the q-axis voltage command value Vq* are calculated based on Expression (16) and Expression (17) as with Embodiment 1. Since the voltage phase θv of the voltage command value is slightly advanced with respect to the phase θ, it is calculated based on Expression (19) as with Embodiment 1.

The three-phase voltage command values Vu*, Vv* and Vw* are calculated based on Expression (23) from the voltage phase θv obtained using Expression (19), the d-axis voltage command value Vd* and the q-axis voltage command value Vq*. The amplitudes of the three-phase voltage command values are reduced by a correction amount V_BEET obtained by multiplying the ripple component P_BEET of the active power by a coefficient Kv.

[Equation 8]

$$\begin{pmatrix} Vu^* \\ Vv^* \\ Vw^* \end{pmatrix} = \sqrt{(Vd^*)^2 + (Vq^*)^2} - \text{V\_BEET} \begin{pmatrix} \cos(\theta v) \\ \cos\left(\theta v - \frac{2}{3}\pi\right) \\ \cos\left(\theta v + \frac{2}{3}\pi\right) \end{pmatrix} \quad (23)$$

$$\text{V\_BEET} = Kv \, \text{P\_BEET} \quad (24)$$

According to Expression (23), if the ripple component P_BEET, derived from the ripple detection unit 8A in synchronization with the motor current and the torque ripple on the output side of the inverter 4, is positive in sign, then the amplitudes of the three-phase voltage command values Vu*, Vv* and Vw* that are output from the voltage control unit 7A are reduced. Conversely, if the ripple component P_BEET, derived from the ripple detection unit 8A is negative in sign, then the amplitudes of the three-phase voltage command values Vu*, Vv* and Vw* that are output from the voltage control unit 7A are increased, thereby enabling reductions of the motor current ripple on the output side of the inverter 4 and the associated torque ripple.

Note that since, in the present embodiment, the amplitudes of the voltage command values are corrected, the DC voltage cannot be increased to its maximum value even in the frequency zone that is in the constant-voltage and variable-frequency (CVVF) control mode, and thus, the DC voltage needs to be lowered from the maximum value by a control amount required for reducing the ripple.

The DC voltage command generation unit 16A receives the active power P, which is removed its ripple component and is output from the ripple detection unit 8A, and the angular frequency ω. The absolute value unit 18 and the DC voltage value set table 19 are the same as those in Embodiment 1. The purpose of the DC voltage command generation unit 16A according to Embodiment 2 is to relieve the stress on the switching device constituting the inverter 4 by varying an amplitude of increasing the DC voltage according to the active power, in addition to limiting a period of time of increasing the DC voltage, more than that in Embodiment 1. The present embodiment is based on the fact that the beating phenomenon varies depending on a power or torque generated by the motor, that is, the greater the power at the same speed, the larger the beating phenomenon becomes. Conversely, when the power is small, its ripple factor is within the allowable range even if the DC voltage is at the rated voltage. FIG. 7 of Non-Patent Document 1 also shows that when the voltage is constant, the larger the output from the converter, the larger the ripple factor becomes.

An absolute value unit 18b of the DC voltage command generation unit 16A receives as an input the active power P having the positive or negative signs, to take the absolute value of the active power P, and then to output the absolute value as an active power value P1. A divider 25 divides the value P1 by a predetermined value (for instance, a maximum power) to output the coefficient Kp. The coefficient Kp is definitely limited to within the range 0=<Kp=<1 by a limiter 26. A multiplier 27 performs multiplication of an output value of the limiter 26 by an output value of the DC voltage value set table 19, and the DC voltage command value Vc* thereby results in a value that the active power is taken into consideration. Because when the value calculated by the multiplier 27 is a small value such as zero, a small value such as 0 V is produced, a limiter 28 performs the voltage limiting function so that the DC voltage command value Vc* falls into the range of 3000 V to 3600 V, inclusive.

Since, according to Expression (12), the ripple factor is proportional to the active power output by the inverter and reversely proportional to the DC voltage squared, and if the coefficient Kp is made proportional to the square root of the active power, the ripple factors are substantially the same regardless of the magnitude of the active power so long as the active power is large.

In the present embodiment, the DC voltage command value increases as the active power increases; however, it is expected that a similar advantageous effect is provided also by increasing the DC voltage command value when a value(s) other than the active power—such as the current value, the command torque value, the torque current command value, or the torque current value—increase(s). This is true for embodiments below.

From the above description, by implementing Embodiment 2, the advantageous effect is provided in that an influence resulting from the ripple due to the AC-DC conversion by the converter is detected as a ripple component contained in the active power, thus correcting the amplitude of the voltage output from the inverter, whereby the torque ripple and the like are reduced. Further, when the active power is smaller than the predetermined value, the DC voltage is made to be a usual value, and when the active power is greater than the predetermined value, the DC voltage value is made to increase as the active power increases, thereby providing an advantageous effect in that the stress on the switching device constituting the inverter can be relieved in addition to reduction of the capacitor capacitance. Consequently, another advantageous effect is provided in that compactness and cost reduction of an electrical power conversion apparatus is achieved.

Embodiment 3

Figure 11:
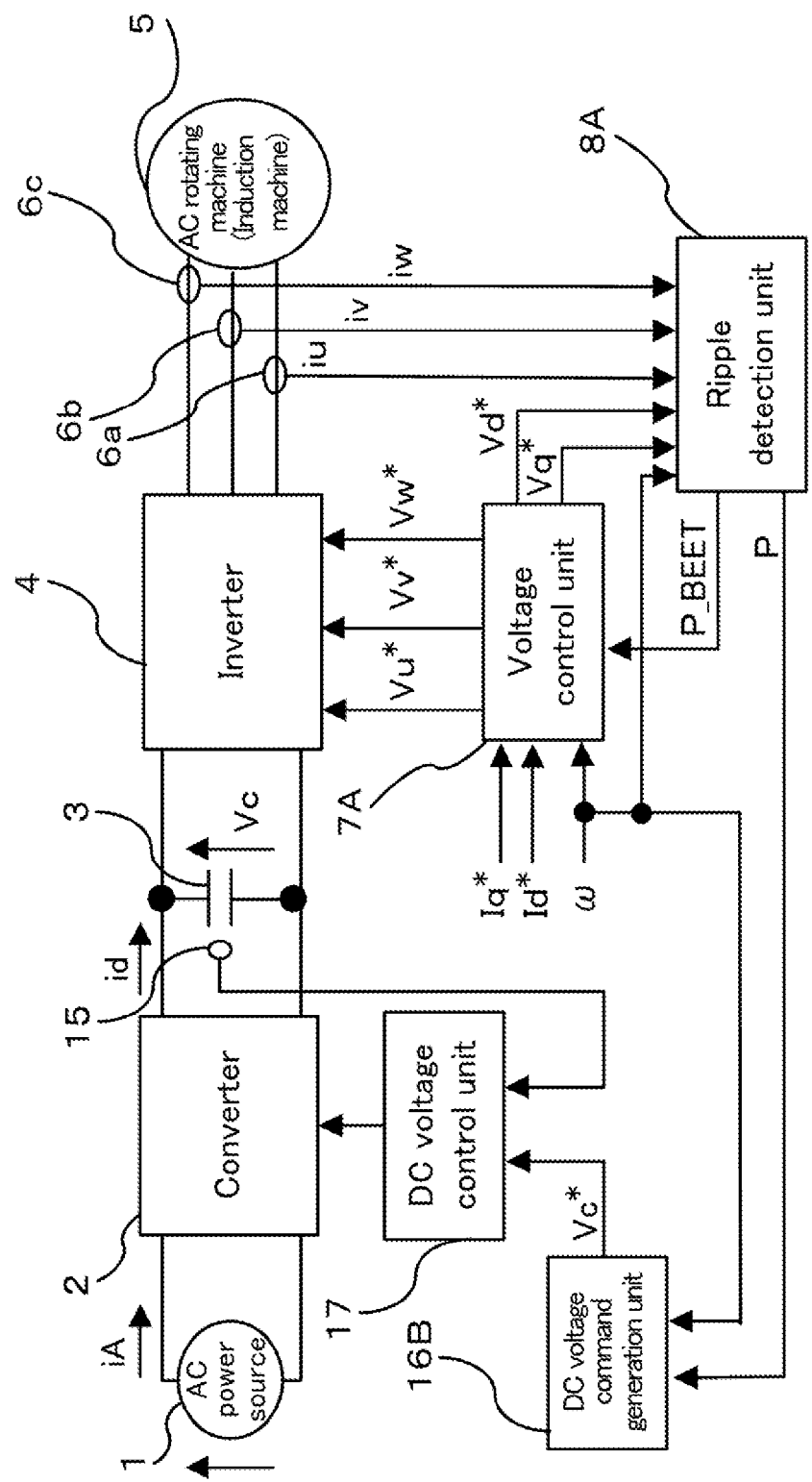
FIG. 11 is a block diagram showing an example of a configuration of an electrical power conversion apparatus according to Embodiment 3 of the present invention.

FIG. 11 is a block diagram showing an example of a configuration of an electrical power conversion apparatus according to Embodiment 3. Embodiment 3 is different only in a DC voltage command generation unit 16B from Embodiment 2. In Embodiment 3, such DC voltage value set table 19 that express condition where the DC voltage is controlled according to a value of the calculated active power is further limited to when the active power has a positive value, is used. In other words, increasing the DC voltage is limited to only the time during power operation, and during regeneration operation the DC voltage is fixed at a rated voltage of 3000 V. The present embodiment is based on the fact that the beating phenomenon during regeneration operation is smaller than that during power operation, and is aimed to achieve more energy saving by transferring as much energy as possible back to the AC power source, from the viewpoint of energy conservation during regeneration operation. Note that configurations other than those described are similar to those in Embodiment 2 and pertinent figures use the same reference numerals as well. Only the differences will be described herein.

Figure 10:
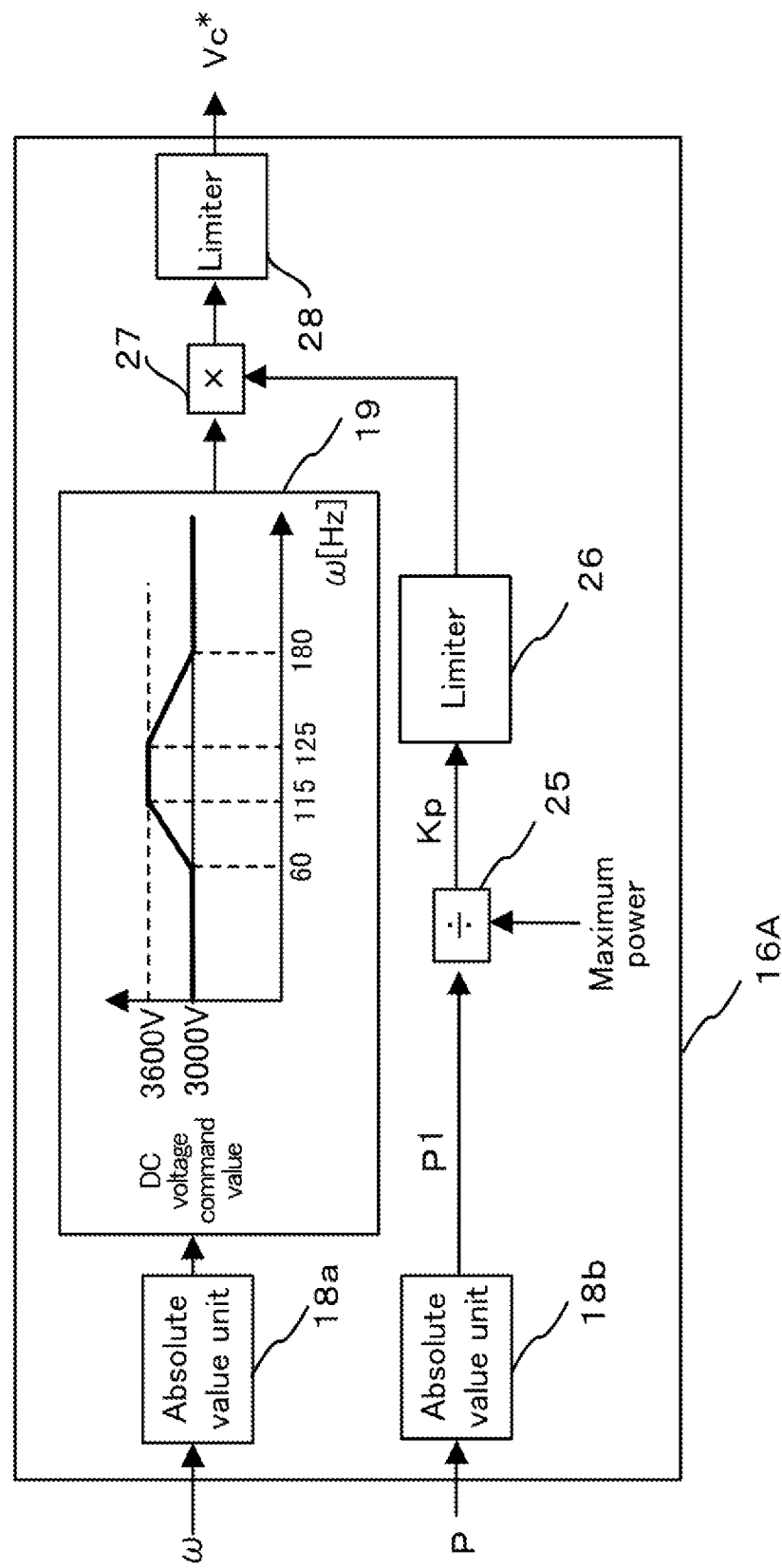
FIG. 10 is a diagram showing a DC current command generation unit in the electrical power conversion apparatus according to Embodiment 2 of the present invention.
Figure 12:
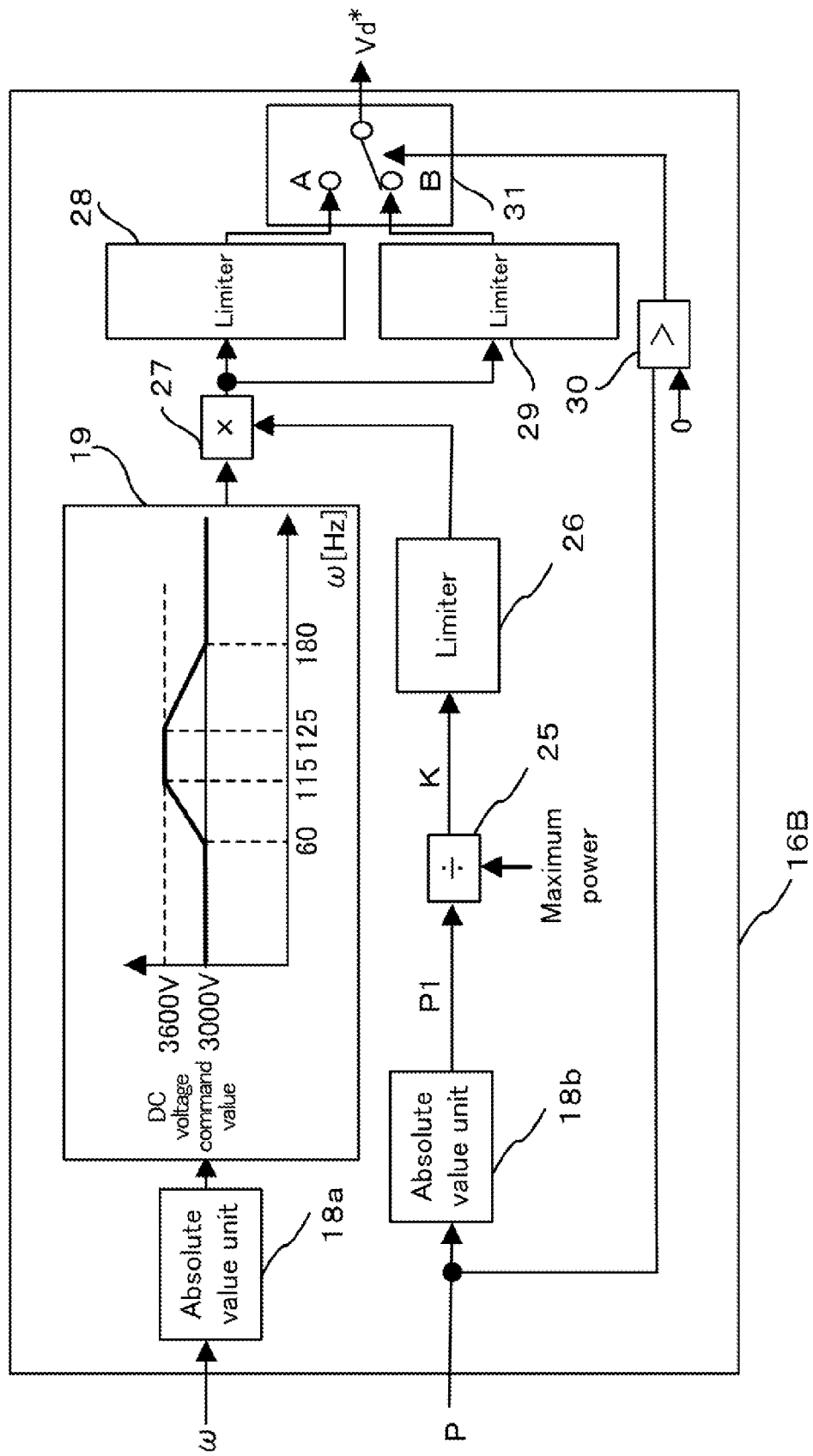
FIG. 12 is a diagram showing a DC current command generation unit in the electrical power conversion apparatus according to Embodiment 3 of the present invention.

FIG. 12 is a diagram showing a DC current command generation unit in the electrical power conversion apparatus according to Embodiment 3 of the present invention. In comparison with FIG. 10 in Embodiment 2, added are a limiter 29, a comparator 30, and a switching unit 31.

If the active power P is greater than zero, that is, during power operation, the comparator 30 generates an output signal of 1, so that the switching unit 31 is set to a position A. When the active power P is zero or less, that is, during coasting or regeneration operation, the comparator 30 further generates an output signal of zero, so that the switching unit 31 is set to a position B.

In order to fix the DC voltage at a rated value of 3000 V during regeneration operation, the limiter 29, which is connected to a contact of the position B of the switching unit 31, performs two voltage limiting operations, one operation limits to be 3000 V or more and the other operation limits to be 3000 V or less.

Not only the active power, but also the torque command, power operation command, or regeneration operation (braking) command can be used as the signal for switching between settings A and B of the switching unit 31 to gain the same advantageous effect.

In the present embodiment, the DC voltage command generation unit 16B includes the comparator 30, the limiter 29 and the switching unit 31, so that increasing the DC voltage is limited only to the time during power operation and the DC voltage during regeneration operation is fixed at a rated voltage of 3000 V. This limits the condition for increasing the DC voltage, thereby providing an advantageous effect in that the stress on the switching device constituting the inverter 4 can be relieved. In the present embodiment, the DC voltage during power operation remains unchanged at the usual value while the active power is small in amount, and increases as the active power, which is not small, increase. The same advantageous effect is obtained, as long as the DC voltage during regeneration operation is fixed at the usual value, even if the DC voltage during power operation is increased without considering amount of the active power.

Embodiment 4

Figure 13:
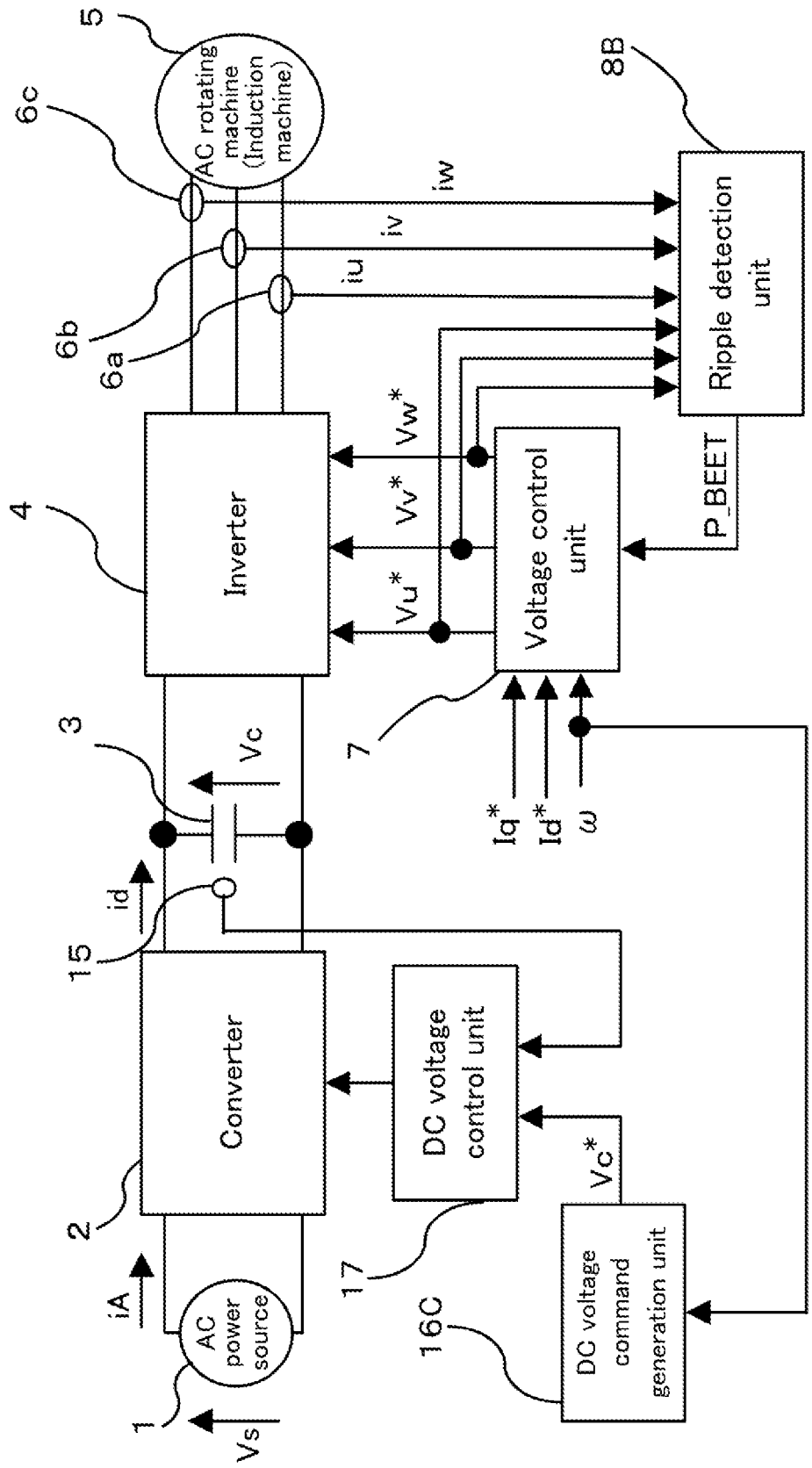
FIG. 13 is a block diagram showing an example of a configuration of an electrical power conversion apparatus according to Embodiment 4 of the present invention.
Figure 14:
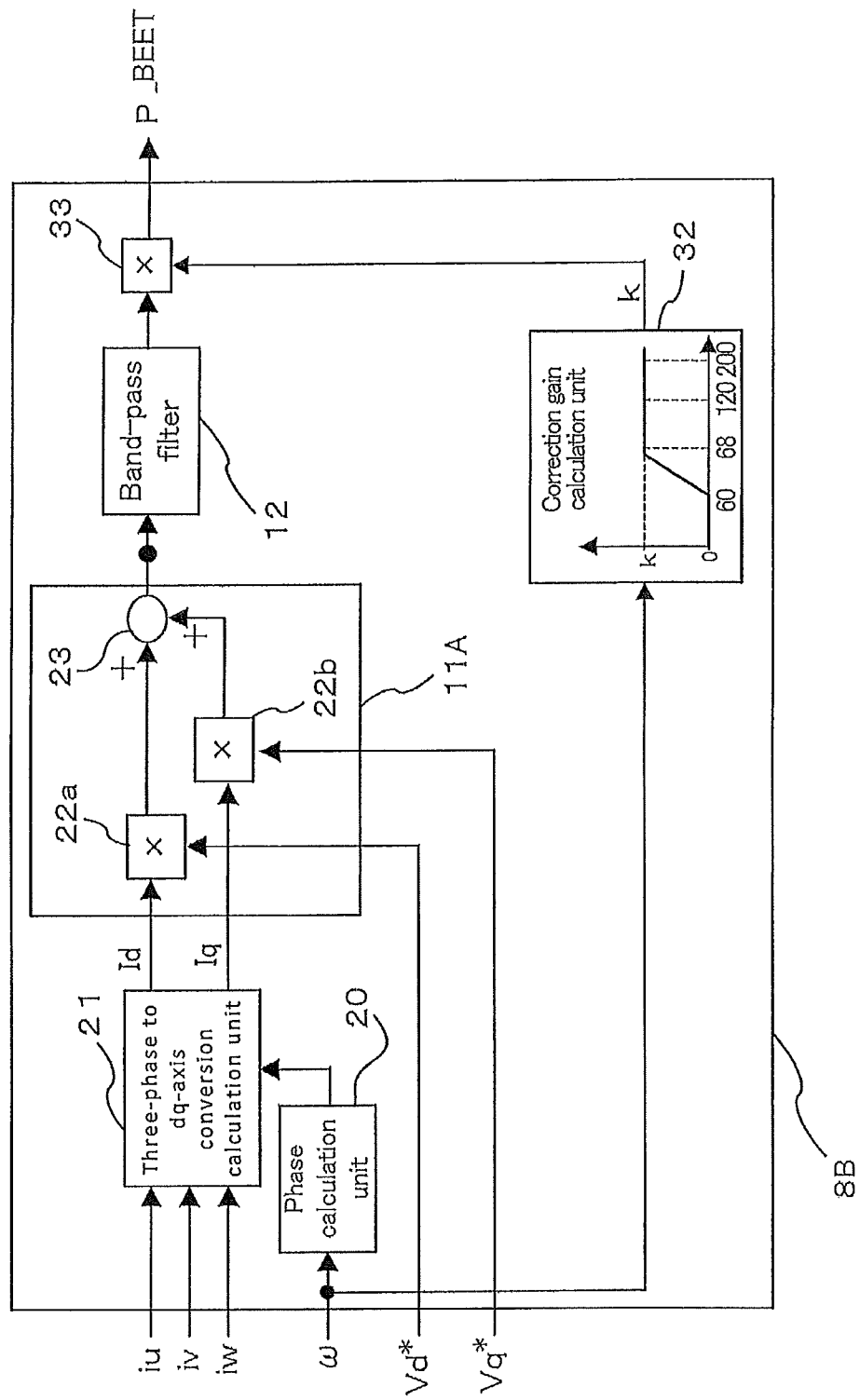
FIG. 14 is a diagram showing a ripple detection unit in the electrical power conversion apparatus according to Embodiment 4 of the present invention.

FIG. 13 is a block diagram showing an example of a configuration of an electrical power conversion apparatus according to Embodiment 4. FIG. 14 is a diagram showing a ripple detection unit in the electrical power conversion apparatus according to Embodiment 4 of the present invention. The differences in Embodiment 4 when compared to Embodiment 2 are a ripple detection unit 8B and a DC voltage command generation unit 16C.

As with Embodiment 2, the ripple detection unit 8B includes the three-phase to dq-axis conversion unit 21, the phase calculation unit 20, the active power calculation unit 11A and the band-pass filter 12, and additionally includes a correction gain calculation unit 32 that receives the angular frequency $\omega$ as an input, to calculate a correction gain k, and a multiplier 33 that multiplies the correction gain k, which is an output from the correction gain calculation unit 32, by an output value of the band-pass filter 12.

The correction gain k, which varies with the angular frequency $\omega$, may be determined using the table data, or may be provided in the form of a mathematical function. In particular, the correction gain is determined to become a maximum before the ripple frequency component of 120 Hz, for instance. Further, if the correction gain is determined zero, then no correction will be made, which provides an advantageous effect in that, by varying the correction gain with respect to the angular frequency $\omega$, it is determined whether or not a correction is to be made, or if actually made, how much of the correction is required can be varied according to the angular frequency $\omega$.

FIG. 15 is a diagram showing the DC voltage unit command generation 16C in the electrical power conversion apparatus according to Embodiment 4 of the present invention. The ripple detection unit 16C is configured with an absolute value unit 18 that converts the angular frequency ω to its absolute value, and a DC voltage value set table 19B. Because the angular frequency ω to be supplied is assigned a positive or negative sign, the absolute value unit 18 converts the angular frequency ω to the absolute value so that only a positive value is selected in order to simplify the DC voltage value set table 19B. In the figure, the absolute value of the angular frequency ω is shown on the horizontal axis and a DC voltage command value to be generated, on the vertical axis. In the DC voltage value set table 19B as shown in FIG. 15, the DC voltage is at its maximum voltage of 3300 V in a predetermined range (a range of 115 Hz or more in the present embodiment) including the frequency that is twice (in this case, the frequency is at 120 Hz; however, 100 Hz may in some cases be used depending on an AC power source) the AC power source frequency in which a beating phenomenon is enhanced; and in the previous range, the DC voltage is increased progressively. An advantageous effect is that keeping the voltage high also in a range of 120 Hz or more eliminates operation of reducing the DC voltage, and another advantageous effect is that a loss in a high speed range at 120 Hz or more can be reduced because increasing the voltage reduces the motor current flowing through the motor.

The output voltage of the inverter 4, that is, a motor voltage Vm is controlled so that a value of Vm/ω is substantially constant, in a range where the frequency ω of the inverter 4 is above zero and under the predetermined angular frequency (ω1) (i.e., a range of 0<ω–ω1). After the motor voltage Vm has reached a maximum value shown based on the following equation, the inverter 4 can no longer control an output voltage amplitude. The angular frequency at which the voltage reaches the maximum value is ω1. The value of ω1 is normally smaller than a frequency corresponding to twice the AC power source frequency. In a range where the angular frequency ω is larger than ω1, the motor voltage Vm is fixed at its maximum value, and only the frequency varies.

$$Vm = (\sqrt{6}/\pi) \times Vc \qquad (25)$$

The characteristic of a maximum torque Tmax of the induction machine that is controlled with this pattern of the motor voltage Vm is shown by the following relationship in the high speed (ω>ω1) range.

$$Tmax \propto (Vc/\omega)^2 \qquad (26)$$

When the DC voltage Vc is assumed constant, the maximum torque Tmax is reversely proportional to the square of the angular frequency ω. Thus, the torque is significantly reduced in, particularly, the high speed range, so that the sufficient torque is difficult to obtain in the high speed range.

Even without increasing a withstand voltage of the switching device constituting the inverter 4, the DC voltage Vc can be increased in the high speed range (ω>ω1), as will be described next.

The switching device constituting the inverter 4 employs an insulated gate bipolar transistor (IGBT) having a turn-on and off ability.

Figure 16:
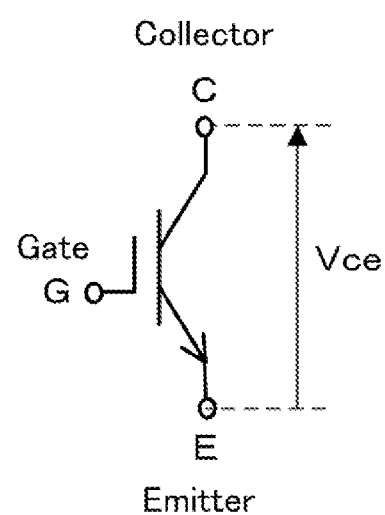
FIG. 16 is a diagram showing a switching device in a single arm constituting an inverter according to Embodiment 4 of the present invention.
Figure 17:
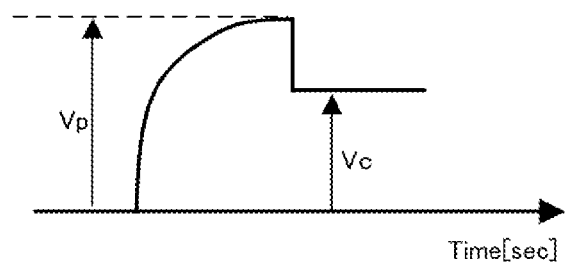
FIG. 17 is a graph showing a voltage waveform of the switching device in a single arm constituting the inverter according to Embodiment 4 of the present invention.

A peak value Vp of a collector-emitter voltage waveform Vice of the IGBT device, shown in FIG. 16, when the device interrupts a current I is represented empirically by the following equation.

$$Vp = Vc + I \times \sqrt{(L/C)} \qquad (27)$$

where L is an inductive value of IGBT stray inductance, and C is a stray capacitance of IGBT stray capacitor.

In terms of a current value interrupted by the IGBT in an actual operation, the one pulse mode is small compared to a multi-pulse (asynchronous) mode. The IGBT interrupts the current at its ripple peak value. Although the maximum value of current, Ip to be interrupted by the IGBT in the multi-pulse (asynchronous) mode slightly varies depending on factors such as the motor constant of induction machine, a modulation index of the output voltage output from the inverter 4, and a length of wiring between the inverter 4 and the induction machine, the current value Ip, if a fundamental wave RMS value of the motor current flowing through a motor is designated Im, is represented empirically as follows:

$$Ip = 1.5 \times \sqrt{2} Im \qquad (28)$$

where the above coefficient 1.5 is normally a value on the order of 1.3 to 1.5, and the upper limit value of 1.5 is used here.

On the other hand, in a motor waveform in the one pulse mode, a current to be interrupted Iq corresponding to when the IGBT device interrupts the current once per cycle is represented empirically as shown below, if the fundamental wave RMS value of the motor current is designated Im.

$$Iq = 0.7 \times \sqrt{2} Im \qquad (29)$$

In Expression (28) and Expression (29), if the value Im is assumed to be unchanged in any pulse mode, the following equation hold:

$$Ip \approx 2.1 \times Iq \qquad (30)$$

When the pulse mode is transferred to the one pulse mode, the amount of overcharging $I \times \sqrt{(L/C)}$ in Expression (27) becomes smaller and even if the DC voltage Vc is increased to compensate for such decrease of the amount, the peak value Vp of the IGBT collector-emitter voltage does not increase accordingly.

The inductive value L of the stray inductance of IGBT is approximately 3.0 μH, and the stray capacitance C of the stray capacitor is in the range of approximately 1.5 μH to 3.0 μH. Assuming L=3.0 μH and C=1.5 μF, √(L/C) in Expression (27) results in a value of √2=1.41. Even if the DC voltage Vc is determined 3300 V as long as the current I interrupted by the IGBT is 200 A or less, the Vp calculated based on Expression (27) will not exceed 3600 V (the maximum value of voltage applicable to the IGBT). In particular, if the Ip is on the order of 100 A, the Vp results in the order of 3450 V, thereby reducing an influence on the IGBT device. The voltages 3600 V and 3300 V are examples and those voltages are determined with considerations of a characteristics and service conditions of a switching device.

From Expression (30), the value Ip is approximately 257 A when Iq=120 A. From Expression (27), assuming Vc=3300 V and if I=120 A, the value Vp is approximately 3470 A, and if I=257 A, the value Vp is approximately 3660 V. In other words, there exists such range of the fundamental wave RMS value Im of the motor current, that the peak value Vp of IGBT collector-emitter voltage can be kept 3600 V or less in the one pulse mode, that is high speed range, and that the value Vp exceeds 3600 V in the multi-pulse mode. If the value Im is in such range, the DC voltage in the low speed range is set to its usual value, and even when the voltage is increased in a range above the speed range where the beating phenomenon occurs, the withstand voltage of the switching device constituting the inverter 4 does not need to be increased. Namely, when the DC voltage increases in a full speed range, the withstand voltage of the switching device needs to be increased; however, even if the DC voltage is increased in a range above the speed range where the beating phenomenon occurs with the value in the low speed range set to its usual value, the withstand voltage of the switching device does not need to be increased, thus achieving the invention with the manufacture cost of the inverter 4 remaining the same.

From the above description, by implementing Embodiment 4 the influence of the ripple due to AC-DC conversion by the converter is detected as the ripple component contained in the active power of the inverter, thus correcting the amplitude of the voltage output from the inverter, whereby an advantageous effect is provided in that torque ripples and the like are reduced.

Moreover, by increasing the DC voltage during the time when the inverter generates the output frequency in which the beating phenomenon becomes large, the capacitance of the capacitor can be lowered which is necessary for reducing the beating phenomenon to within the permissible range. Consequently, compactness and cost reduction of the electrical power conversion apparatus is achieved. Further, by increasing the DC voltage Vc in a frequency operated in the one pulse mode, the loss can be reduced, and a greater torque can thereby be generated, without placing an increased stress on the switching device.

The maximum value in the command value range of the DC voltage Vc is assumed 3300 V here; however, in the case of the 60 Hz power source in the predetermined range including a frequency of a ripple component of the DC voltage Vc, the maximum value may be increased progressively from, for example, 85 Hz, and set at 3600 V from 115 Hz to 125 Hz, while it may be reduced progressively at a frequency above 125 Hz, and set at 3300 V for 140 Hz or more. In a frequency in which the inverter is operated in the one pulse mode, the voltage is determined to be in a range where the command value of the DC voltage Vc is higher than usual and the stress on the switching device is not increased, whereby an advantageous effect is provided in that the loss can be reduced and a greater torque can thereby be generated. Note that an upper limit voltage value (3300 V, for instance) in the range where the command value of the DC voltage Vc is higher than its usual voltage and the stress on the switching device is not increased, is called one-pulse mode upper limit voltage value. The one-pulse mode upper limit voltage value is determined so that a voltage to be applied to the switching device under assumed service conditions does not exceed its maximum value. If, in a frequency in which the inverter is operated in the one pulse mode, the command value of the DC voltage Vc is determined to be higher than usual but lower than the one-pulse mode upper limit voltage value, the voltage value may vary with the variation in frequency, and the command value may temporarily be the usual voltage.

It should be noted that in each embodiment above, the example of an AC rotating machine (induction machine) is shown as a load connected to the inverter 4; however, the AC rotating machine is not limited to an induction machine, and the load is not limited to the rotating machine. It is expected that a similar advantageous effect will be achieved for another example where the invention is applied to an apparatus that controls another load, for instance, an electromagnetic actuator such as a linear induction motor, a linear synchronous motor, or a solenoid.

INDUSTRIAL APPLICABILITY

The present invention pertains to an inverter that variably drives an AC motor using DC power, as an electrical source, obtained by rectifying an AC power source with a converter. In particular, the inverter is used for an electric railcar on a railway track of a single-phase AC power source where ripple components generated by rectification increases. The invention is applicable to an apparatus that is a consumer product operating on a single-phase power and controls a motor using an inverter, such as an air-conditioner, a refrigerator and a washing machine.

What is claimed is:

1. An electrical power conversion apparatus comprising:
   a converter that converts an AC power from an AC power source into a DC power;
   a capacitor that stores the DC power produced from the converter;
   an inverter that converts to an AC power the DC power stored in the capacitor;
   a voltage control unit that calculates command values for an AC voltage to be output from the inverter, to control the inverter so that the AC voltage becomes the command value;
   a current measuring instrument that measures an AC current output from the inverter;
   a ripple detection unit that receives the AC voltage command values calculated by the voltage control unit and the AC currents measured by the current measuring instrument, to detect a ripple of an active power output from the inverter;
   a voltage measuring instrument that measures the voltage across the capacitor;
   a DC voltage command generation unit that calculates a command value of the voltage across the capacitor according to a frequency of the AC voltage output from the inverter; and
   a DC voltage control unit that receives the voltage measured by the voltage measuring instrument and the command value calculated by the DC voltage command generation unit, to control the converter so that the voltage across the capacitor becomes the command value,
   wherein the DC voltage command generation unit makes the command value of the voltage across the capacitor higher than usual in a situation where the frequency of AC voltage output from the inverter is within a predetermined range including a frequency of a ripple component of the voltage across the capacitor, and the voltage control unit receives the ripple component derived from the ripple detection unit, to calculate the command values for the AC voltage output from the inverter so that the ripple component is reduced.

2. The electrical power conversion apparatus as recited in claim 1, wherein the predetermined frequency range is determined to be that in which the ripple component is permissible.

3. The electrical power conversion apparatus as recited in claim 1, wherein, in at least part of a frequency range in which the inverter operates in one pulse mode, the DC voltage command generation unit determines the command value of the voltage across the capacitor is higher than usual, and equal to or less than an upper limit of a voltage value in a range where a stress on a switching device of the inverter is not increased.

4. The electrical power conversion apparatus as recited in claim 1, wherein the DC voltage command generation unit determines the command value of the voltage across the capacitor to be the usual value in a situation where an absolute value of the active power output by the inverter is below a predetermined value.

5. The electrical power conversion apparatus as recited in claim 1, wherein the DC voltage command generation unit determines the command value of the voltage across the capacitor to be the usual value in a situation where the active power output by the inverter is a negative value.

6. The electrical power conversion apparatus as recited in claim 1, wherein the DC voltage command generation unit includes a DC voltage value set table for calculating the command value of the voltage across the capacitor based on the frequency of the AC voltage output from the inverter, within the predetermined frequency range, there exists a frequency range where the command value is maximized, and, the command value increases with an increase in frequency in a range lower than the range where the command value is maximized within the predetermined frequency range.

7. The electrical power conversion apparatus as recited in claim 6 wherein the command value is decreased with an increase in frequency in a range higher than the range where the command value is maximized within the predetermined frequency range.

8. The electrical power conversion apparatus as recited in claim 1, wherein the ripple detection unit includes an active power calculation unit that calculates an active power output by the inverter and a band-pass filter that derives a ripple from an output from the active power calculation unit.

9. The electrical power conversion apparatus as recited in claim 8, wherein the active power calculation unit calculates an active power by summing together values obtained by multiplying respective AC three-phase currents measured with the current measuring instrument by respective AC three-phase voltage command values calculated by the voltage control unit.

10. The electrical power conversion apparatus as recited in claim 8, wherein the active power calculation unit calculates an active power by summing together values obtained by multiplying respective values in a rotating orthogonal coordinate system converted from the three-phase AC currents measured with the current measuring instrument, by respective voltage command values in the rotating orthogonal coordinate system calculated by the voltage control unit.

11. The electrical power conversion apparatus as recited in claim 8, wherein the band-pass filter is configured by connecting in series
a high-pass filter that includes
a first first-order lag filter with a first time constant, for defining a lower limit of a passband frequency, and
a subtractor that subtracts an output of the first-order lag filter from an input thereof, and
a low-pass filter that includes a second first-order lag filter with a second time constant, for defining an upper limit of the passband frequency.

12. The electrical power conversion apparatus as recited in claim 8, wherein the ripple detection unit includes
a correction gain calculation unit that calculates a correction gain, and
a multiplier that multiplies an output from the band-pass filter by the correction gain output from the correction gain calculation unit, and
wherein an output from the multiplier is that from the ripple detection unit.

13. The electrical power conversion apparatus as recited in claim 12, wherein the correction gain that is output from the correction gain calculation unit varies depending on the frequency of the AC voltage output from the inverter.

14. The electrical power conversion apparatus as recited in any claim 1, wherein the voltage control unit controls, according to the ripple component, the command values for the frequency of the AC voltage that is output from the inverter.

15. The electrical power conversion apparatus as recited in claim 1, wherein the voltage control unit controls, according to the ripple component, the command values for an amplitude of the AC voltage that is output from the inverter according to the ripple component.

* * * * *